US012686232B2

(12) United States Patent
Korkama

(10) Patent No.: US 12,686,232 B2
(45) Date of Patent: Jul. 21, 2026

(54) TIRE AND A LAMELLA PLATE FOR THE MANUFACTURE OF A SIPE OF A TIRE

(71) Applicant: Nokian Renkaat Oyj, Nokia (FI)

(72) Inventor: Tomi Korkama, Nokia (FI)

(73) Assignee: NOKIAN RENKAAT OYJ, Nokia (FI)

( * ) Notice: Subject to any disclaimer, the term of this patent is extended or adjusted under 35 U.S.C. 154(b) by 272 days.

(21) Appl. No.: 18/153,887

(22) Filed: Jan. 12, 2023

(65) Prior Publication Data

US 2023/0226855 A1      Jul. 20, 2023

(30) Foreign Application Priority Data

Jan. 14, 2022     (EP) ..................................... 22151616

(51) Int. Cl.
B60C 11/12              (2006.01)
(52) U.S. Cl.
CPC ... B60C 11/1218 (2013.01); *B60C 2011/1213* (2013.01)
(58) Field of Classification Search
CPC ............. B60C 11/1218; B60C 11/1281; B60C 2011/1254; B60C 2011/133; B60C 2011/1338; B60C 11/1204; B60C 11/1222; B29D 2030/0613
See application file for complete search history.

(56) References Cited

U.S. PATENT DOCUMENTS

2010/0307651 A1 * 12/2010 Castellini ................ B60C 11/12
                                                        152/209.21
2013/0180639 A1      7/2013 Nagayasu

FOREIGN PATENT DOCUMENTS

| JP | 10080923 | A | 3/1998 | |
| JP | 2008087648 | A | 4/2008 | |
| KR | 20180085302 | A | 7/2018 | |
| WO | 1999048707 | A1 | 9/1999 | |
| WO | WO-2008010778 | A1 * | 1/2008 | ............. B60C 11/12 |
| WO | 2018108358 | A1 | 6/2018 | |

OTHER PUBLICATIONS

Extended European Search Report received for EP Application No. 22151616.4 on Aug. 7, 2022, 9 pgs.

* cited by examiner

*Primary Examiner* — Katelyn W Smith
*Assistant Examiner* — Wendy L Boss
(74) *Attorney, Agent, or Firm* — Merchant & Gould P.C.

(57)                     ABSTRACT

A lamella plate for forming a sipe to a tire includes a first surface and an opposite second surface. The first surface has a first primary plate indentation and a first primary plate protrusion, and the second surface has a second primary plate protrusion opposite to the first primary plate indentation and a second primary plate indentation opposite to the first primary plate protrusion. The first surface defines a first primary lamella plate surface having a planar or a curved surface, from which the first primary plate protrusion protrudes and into which the first primary plate indentation descends. The second surface defines a second primary lamella plate surface having a planar surface or a curved surface, from which the second primary plate protrusion protrudes and into which the second primary plate indentation descends. A tire includes a primary first sipe producible in a molding process using the lamella plate.

11 Claims, 12 Drawing Sheets

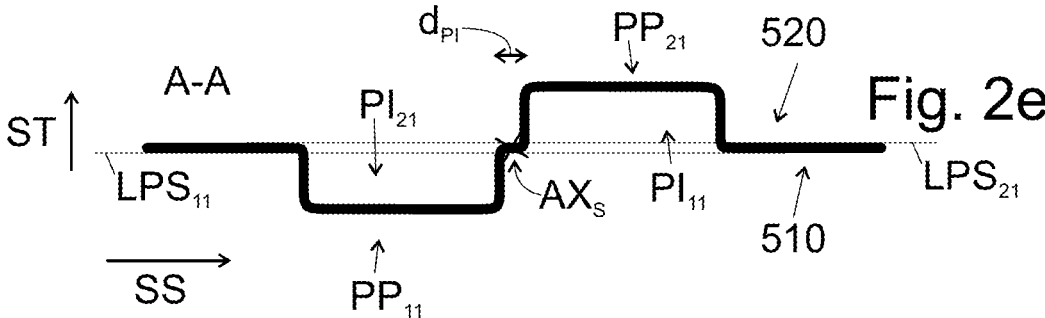
Fig. 2e
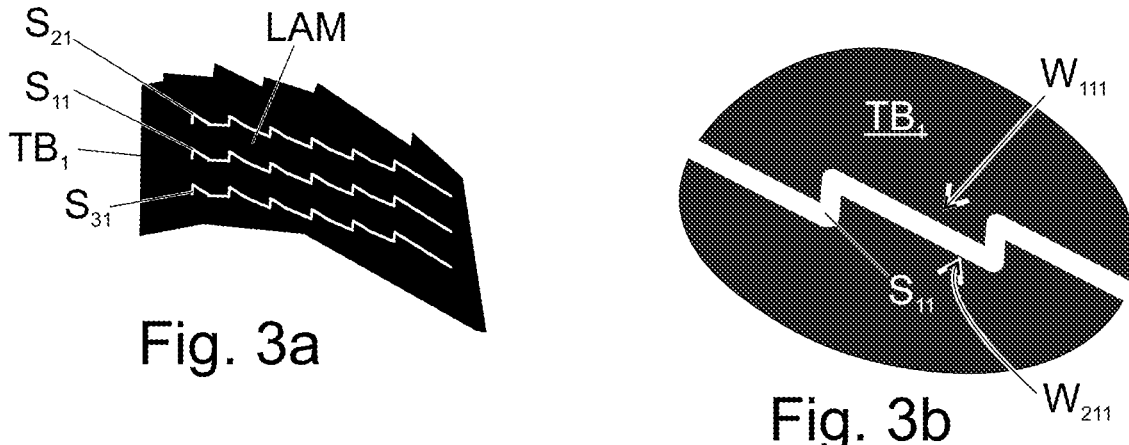
Fig. 3a
Fig. 3b
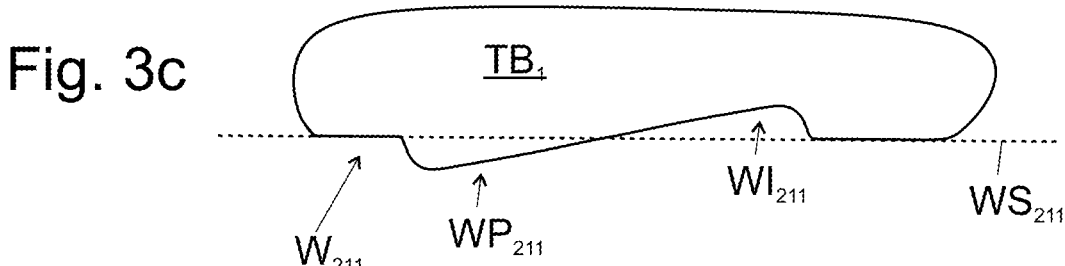
Fig. 3c
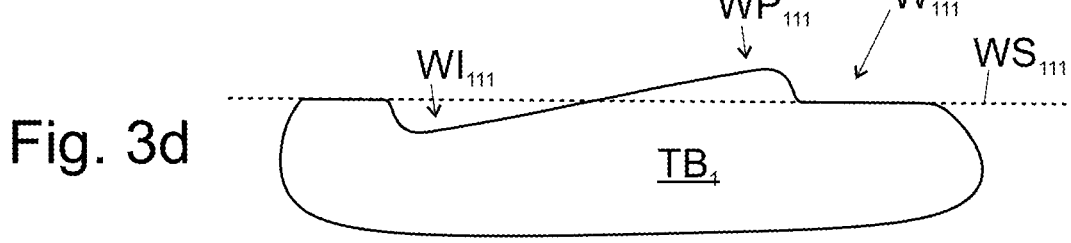
Fig. 3d

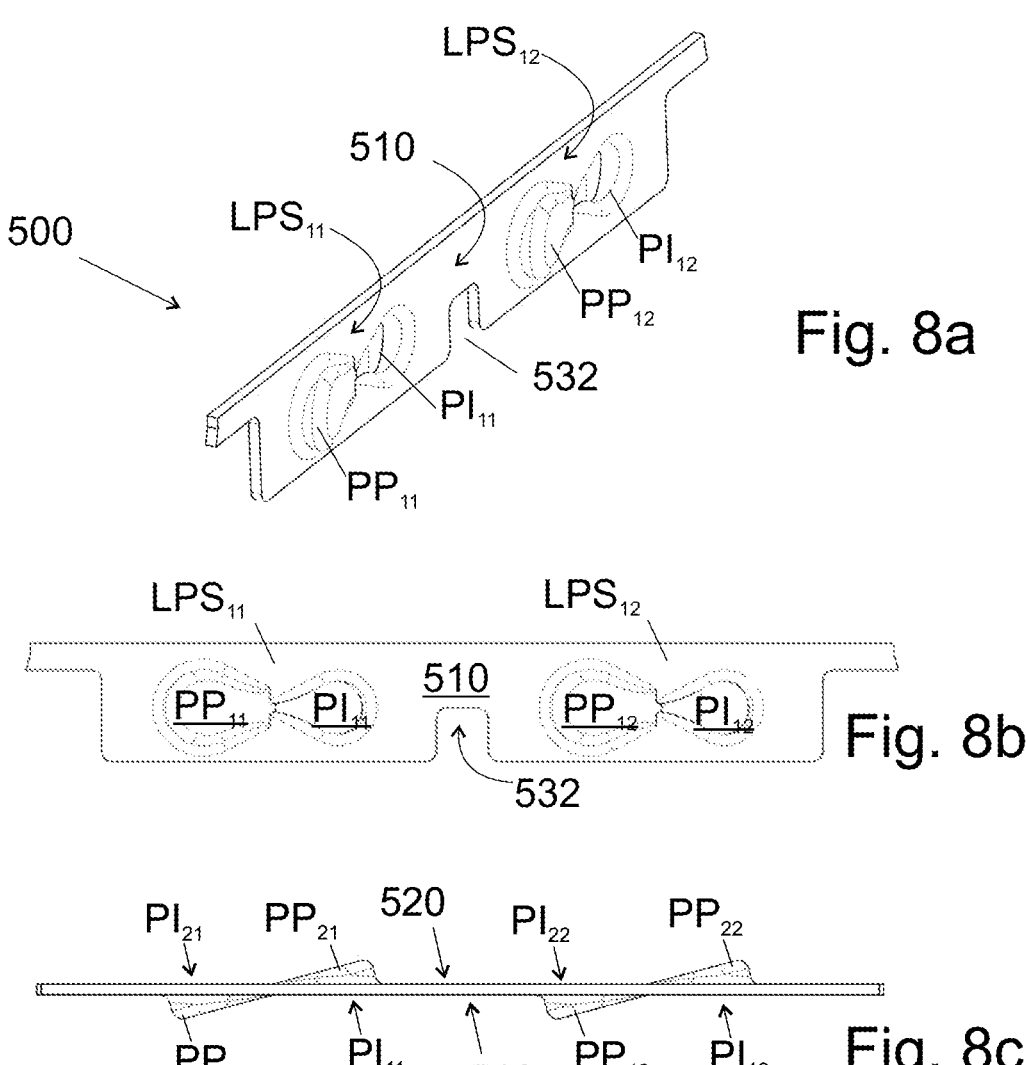
Fig. 8a
Fig. 8b
Fig. 8c
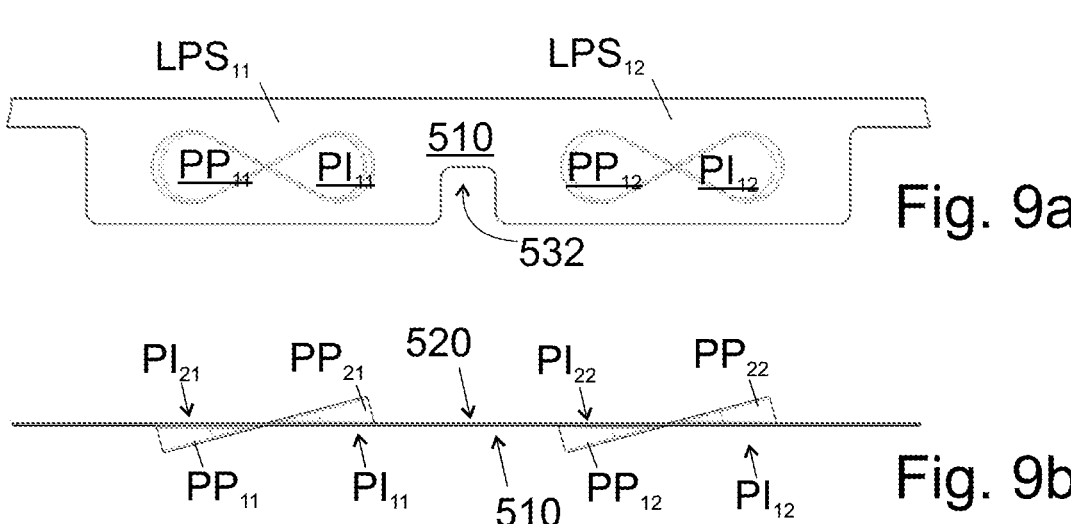
Fig. 9a
Fig. 9b

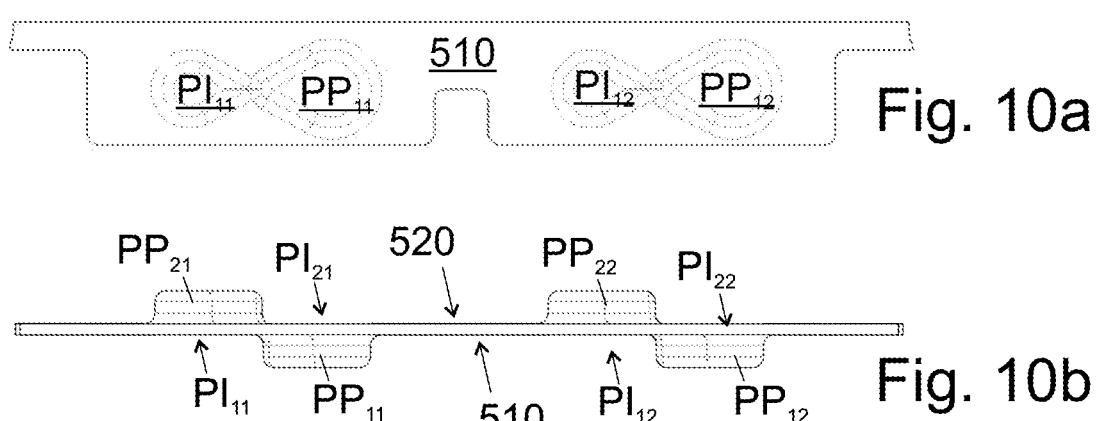
Fig. 10a
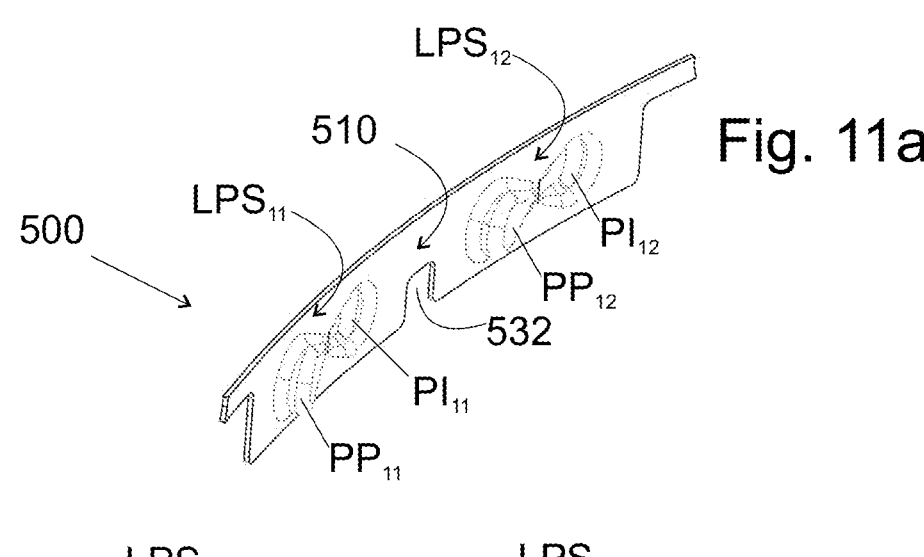
Fig. 10b
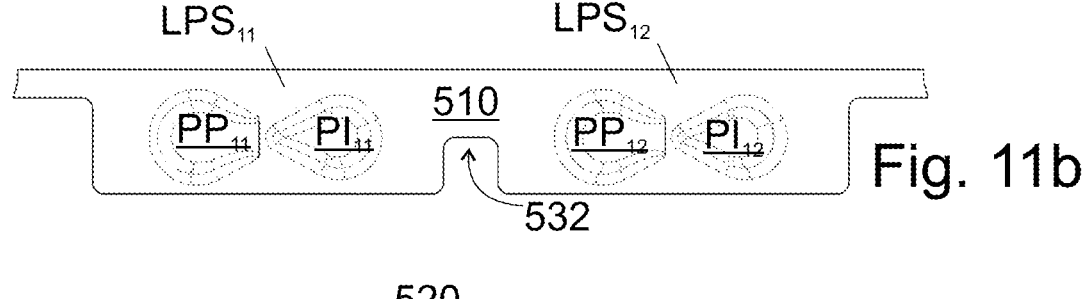
Fig. 11a
Fig. 11b
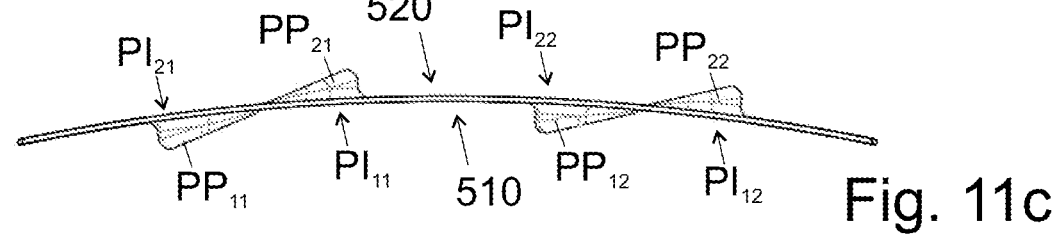
Fig. 11c $$WPP_{11}=WPP_{11}(r_3) \qquad WPI_{11}=WPI_{11}(r_1)$$

$PP_{11}$   $WPP_{11}(r_4)$   $WPI_{11}(r_2)$   $PI_{11}$ $L_{LP12}$ $PP_{11}$    $PI_{11}$       $PP_{12}$    $PI_{12}$

510

532

$PP_{11}$    $PI_{11}$       $PP_{12}$    $PI_{12}$

510

532

$PP_{11}$    $PI_{11}$       $PP_{12}$    $PI_{12}$

510

532

BP   550
BP    BP   550
500        BP

510

530   $PP_{11}$   $PI_{11}$ $LPS_{11}$   532   $PP_{12}$   $PI_{12}$ $LPS_{12}$ $PP_{22}$ $PI_{22}$   BP $PP_{21}$   BP $PI_{21}$   BP   BP

BP    BP

500        BP

BP   $PP_{12}$   $PI_{12}$

BP   $PI_{11}$ $PP_{11}$

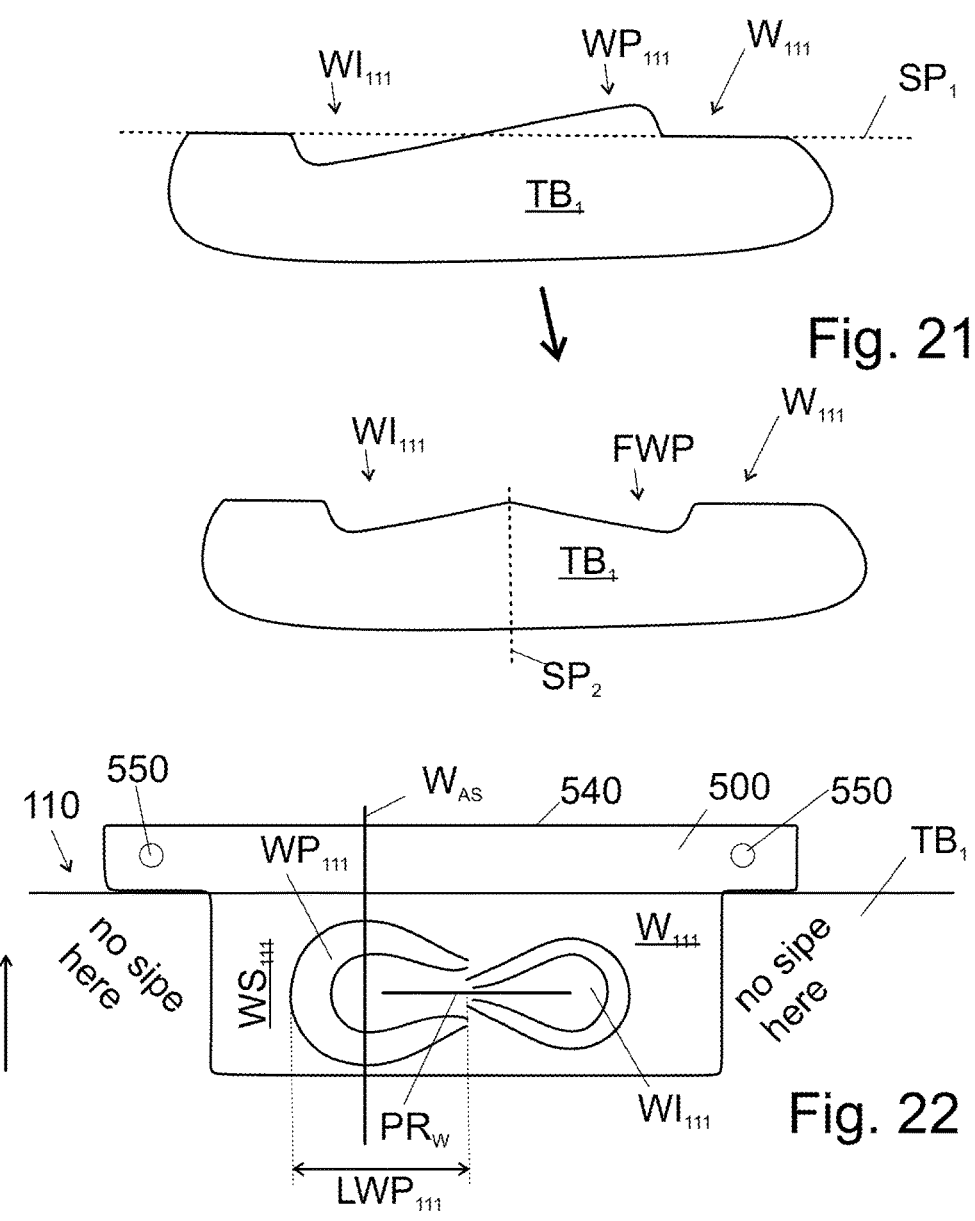
Fig. 21
Fig. 22
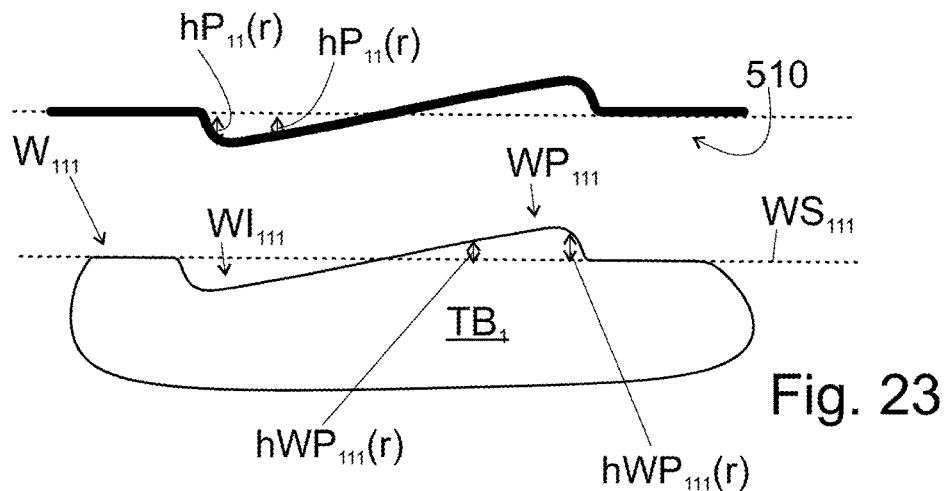
Fig. 23

Fig. 24a
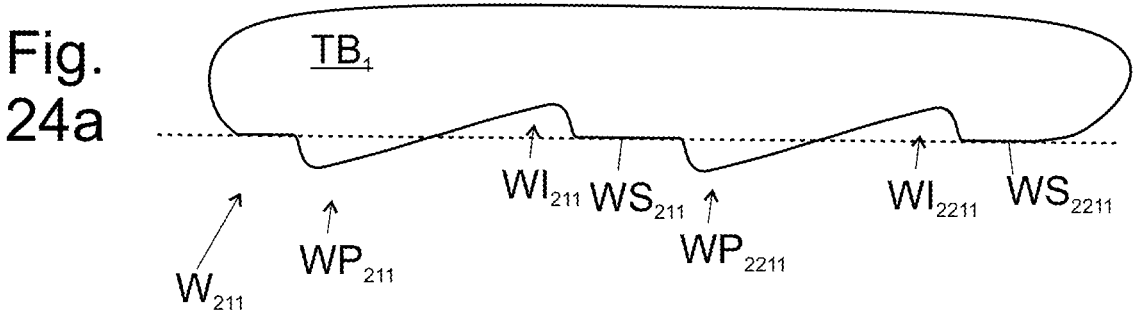
Fig. 24b
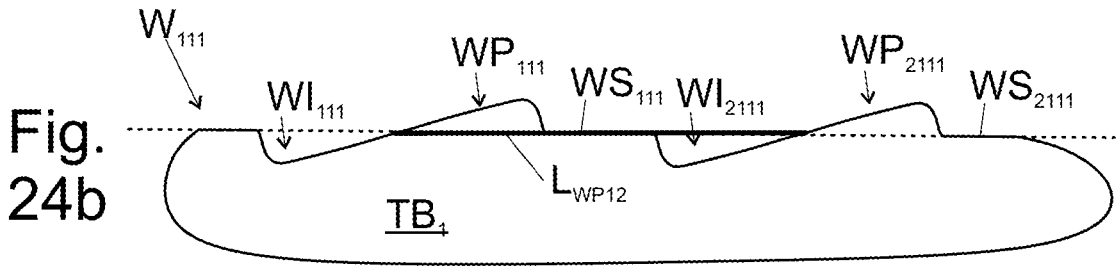
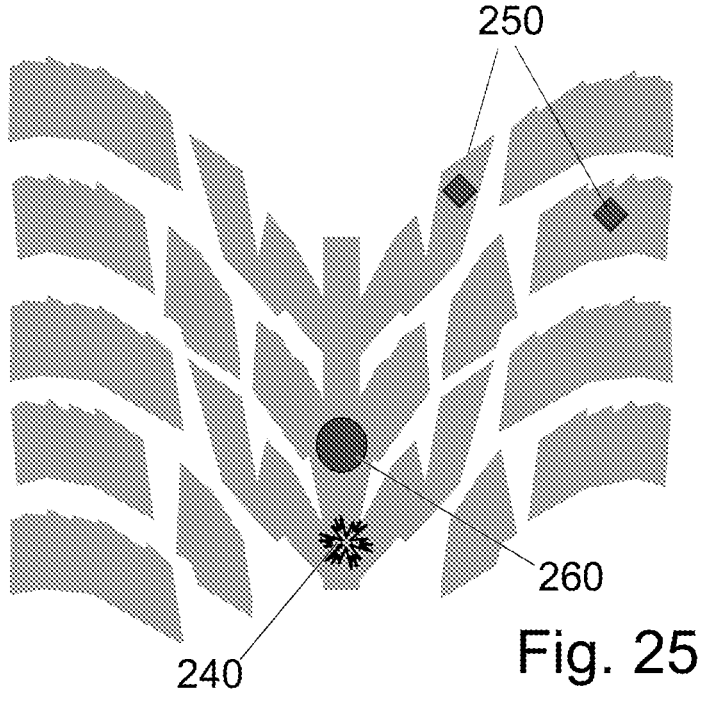
Fig. 25

TIRE AND A LAMELLA PLATE FOR THE MANUFACTURE OF A SIPE OF A TIRE

CROSS-REFERENCE TO RELATED APPLICATION

This U.S. patent application claims the benefit of European Patent Application No. EP22151616.4 filed with the European Patent Office on Jan. 14, 2022, the entire contents of which is incorporated herein by reference.

TECHNICAL FIELD

The present invention relates to a tire having tread blocks, and being provided in the tread blocks with sipes, more particularly to an improved shape of a sipe being capable of providing better traction of the tire. The present invention also relates to a lamella plate that is used in the manufacturing process of a tire for making said sipe. The present invention also relates to the use of said lamella plate for manufacturing a tire.

BACKGROUND OF THE INVENTION

Figure 1A:
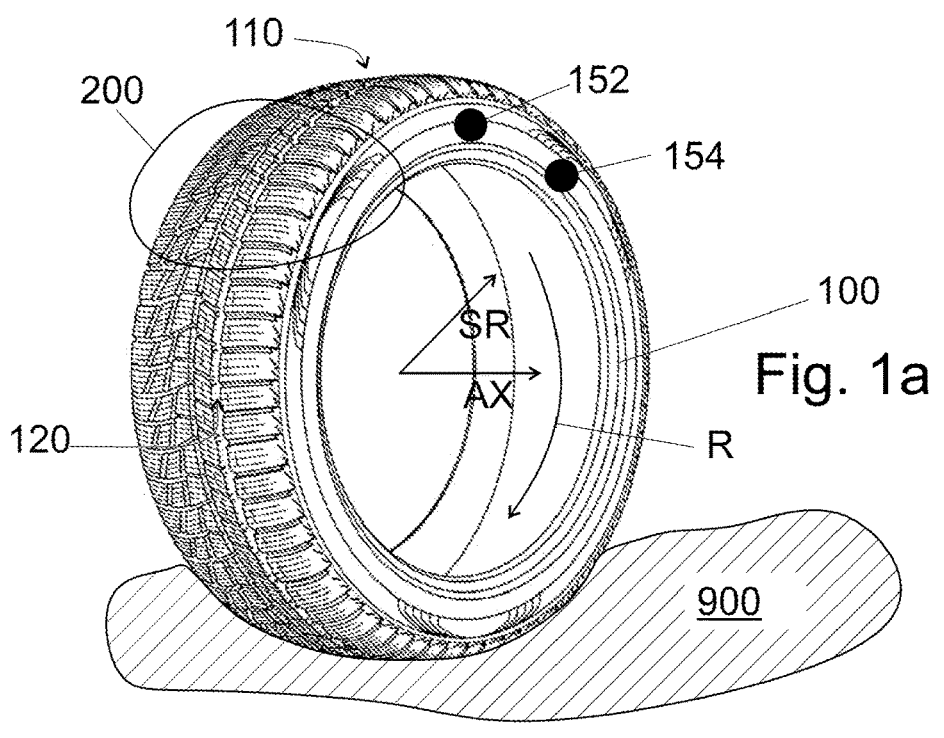
Figures 2A, 2B, 2C, 2D:
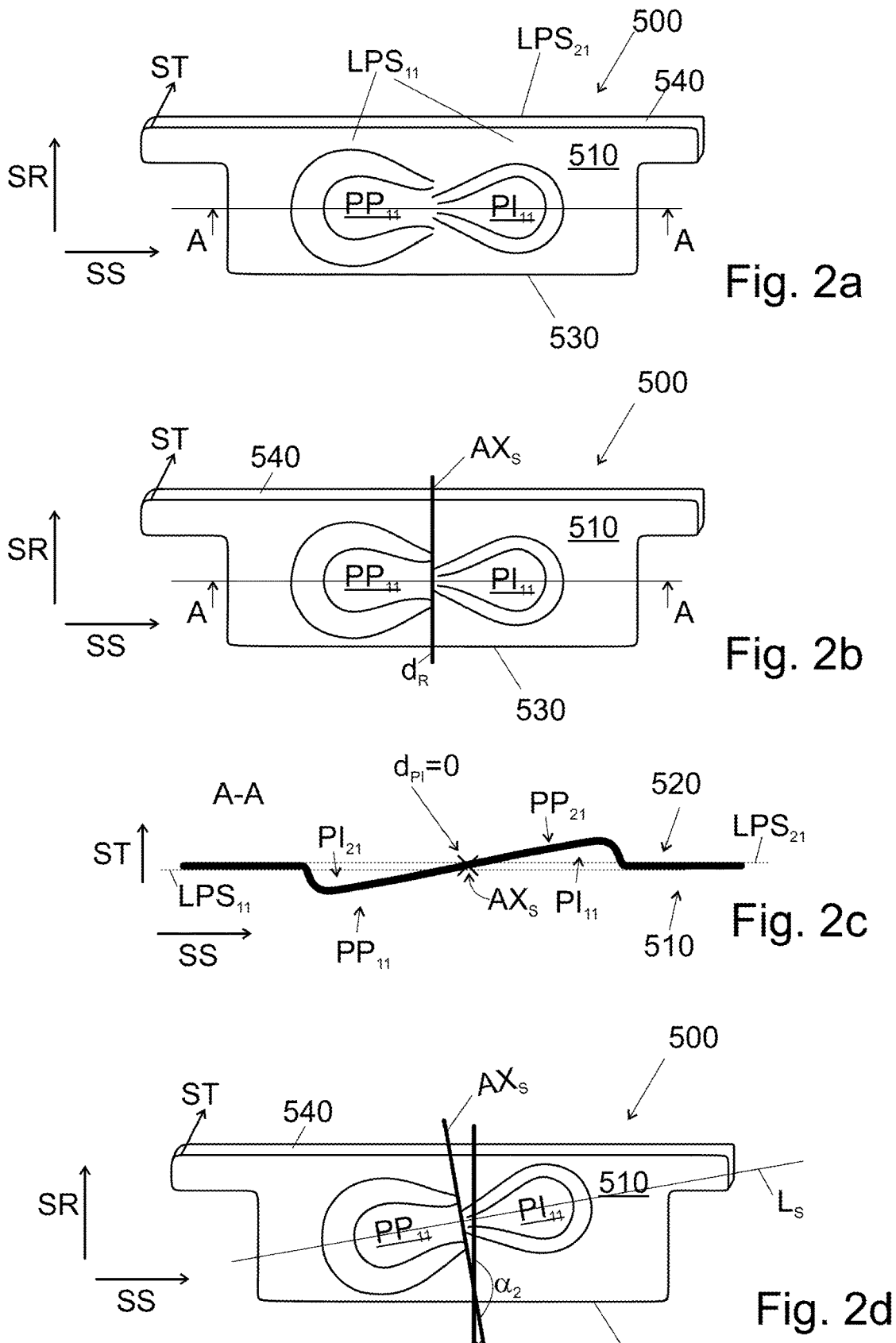

A tread of a known pneumatic tyre is indicated in FIG. 1a. A pneumatic tire is known to include a tread which has circumferential and transversal grooves on its outer surface, said grooves defining a number of tread blocks. The tread is meant for a rolling contact against a ground surface, such as road. The grooves are meant for draining water and/or slush that is possibly located on the ground surface away from the tread, so that the contact between the tread and the ground surface is as good and consistent as possible. Referring to FIG. 2b, some tires are provided in the tread with a number of sipes ($S_{11}$, $S_{21}$, $S_{12}$, $S_{22}$) at various angles with respect to a motion direction of the tire. The sipes not only serve a better tire-ground contact in the rain, but also improve traction, braking and lateral stability on snow by trapping snow as well as providing more gripping edges. The sipes also make the rubber material to deform more easily, in effect making the tire appear softer. This also improves friction. A purpose of the invention is to improve grip, stability, and handling of the tire.

Lamella plates are commonly used in the manufacturing process of a pneumatic tire for making said sipes. The lamella plate is included in a mould, in which the tire is made. After vulcanizing the tire, the tire is removed from the mould, and the lamella plates are removed from the tread. The locations where the lamella plates were arranged define the sipes of the tread. A purpose of the invention is to present a lamella plate that can be used to manufacture the tire with improved grip.

SUMMARY OF THE INVENTION

For improved traction, the opposing walls of a sipes should lock to each other properly particularly during breaking and acceleration and in presence of lateral forces. While some degree of locking is known to occur in some special sipes, the locking of the sipes is not always optimal. An object of the invention is to improve the properties of a tire provided with sipes in the tread blocks so that the sipes can work more efficiently in the sense of improved gripping, improved stability, and improved handling, because of the more efficient locking of the sipe walls.

It is also an object of the invention to provide a lamella plate that is able to make the sipe according to the present invention.

BRIEF DESCRIPTION OF THE INVENTION

Figure 1B:
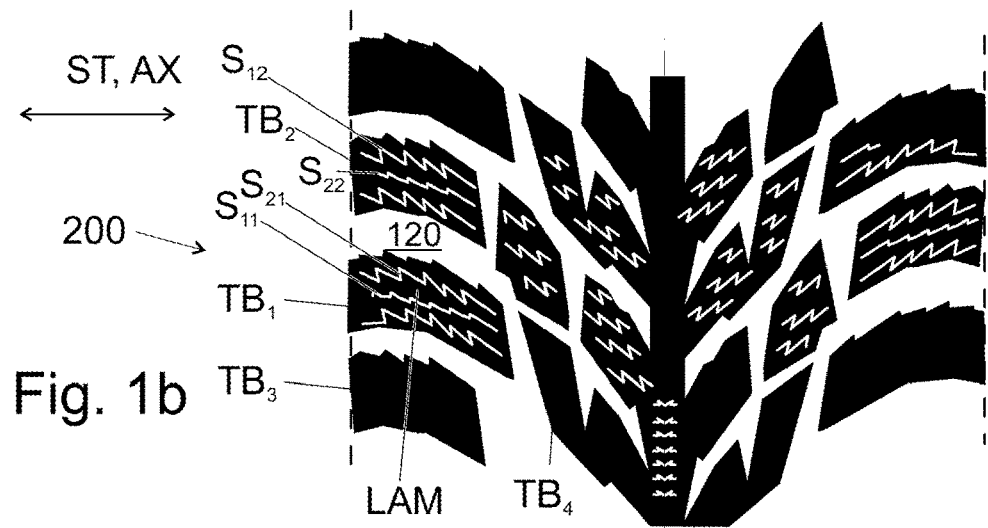
Figure 1C:
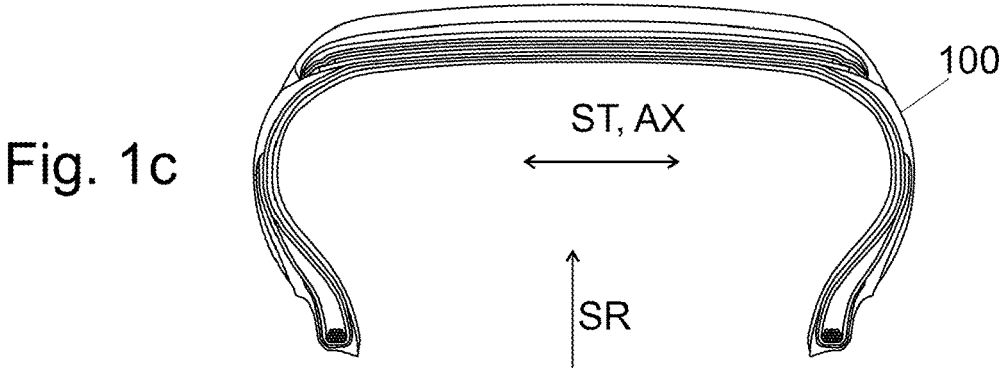
Figure 4A:
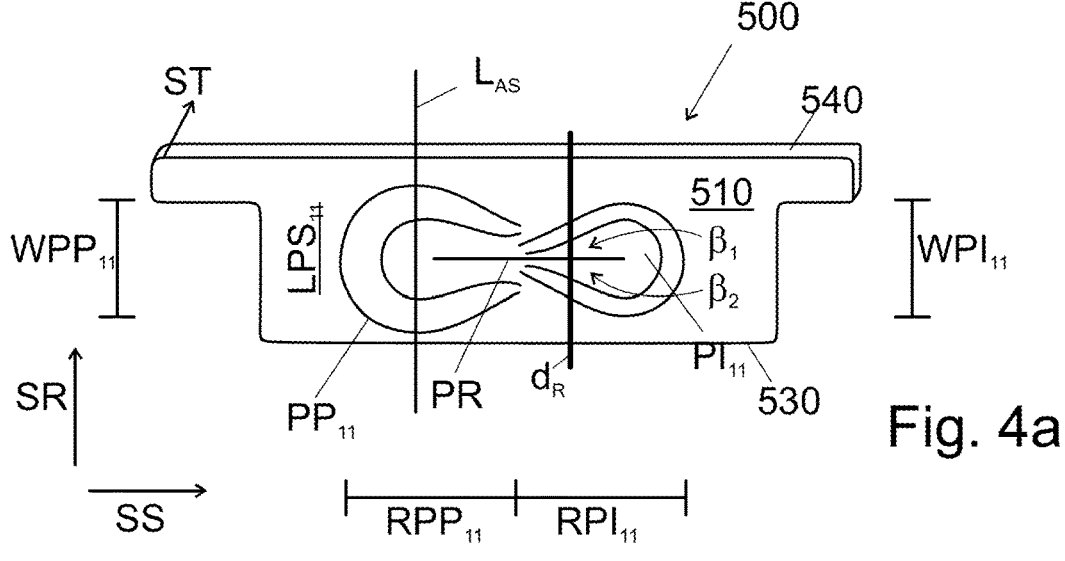
Figure 4B:
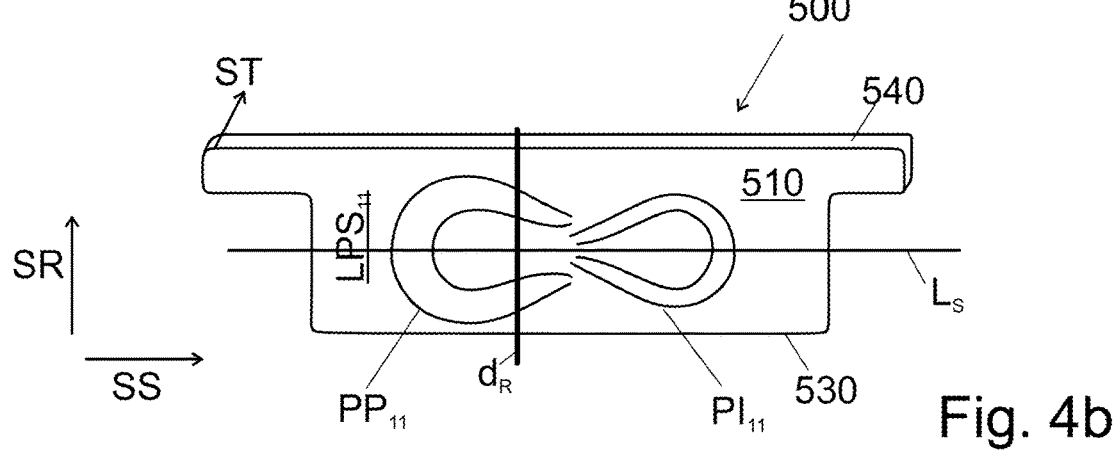
Figure 5A:
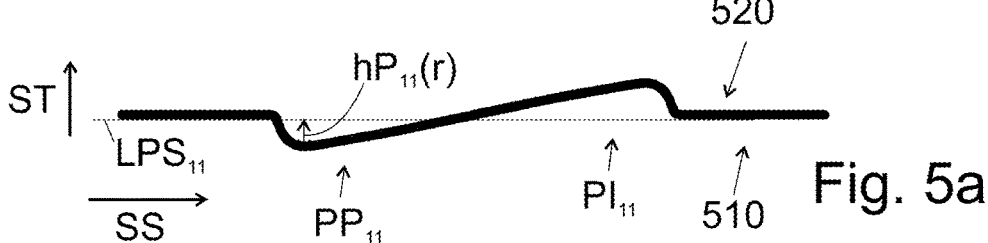
Figure 5B:
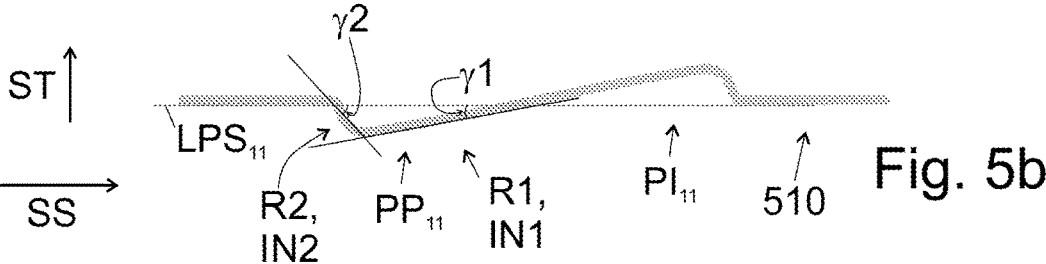
Figure 5C:
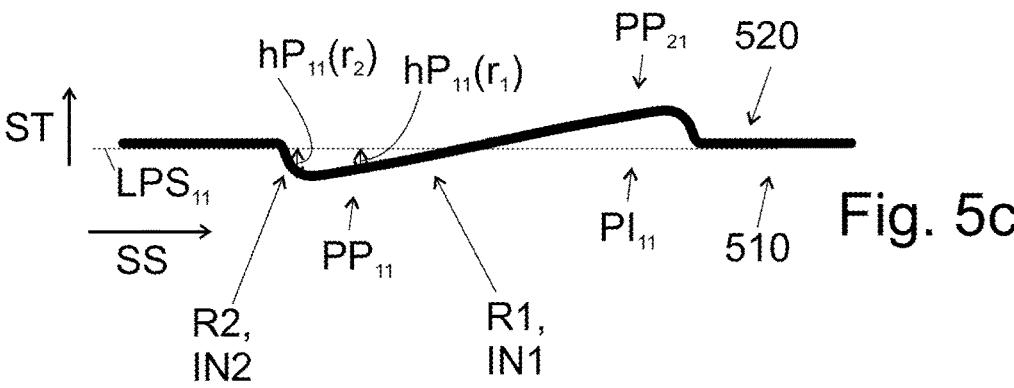
Figure 6A:
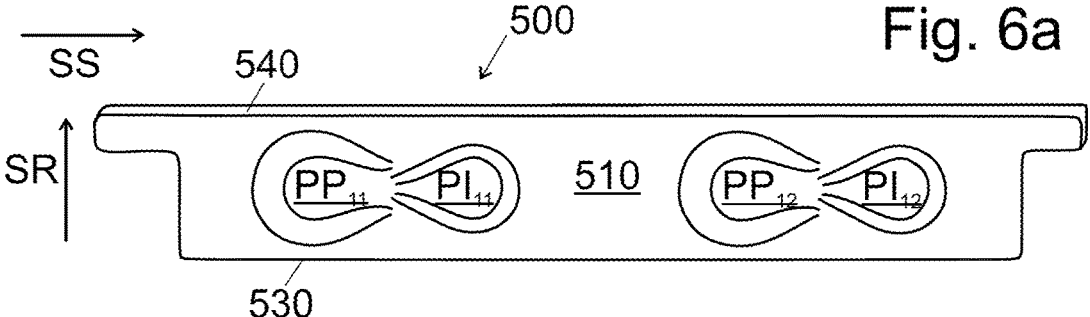
Figure 6B:
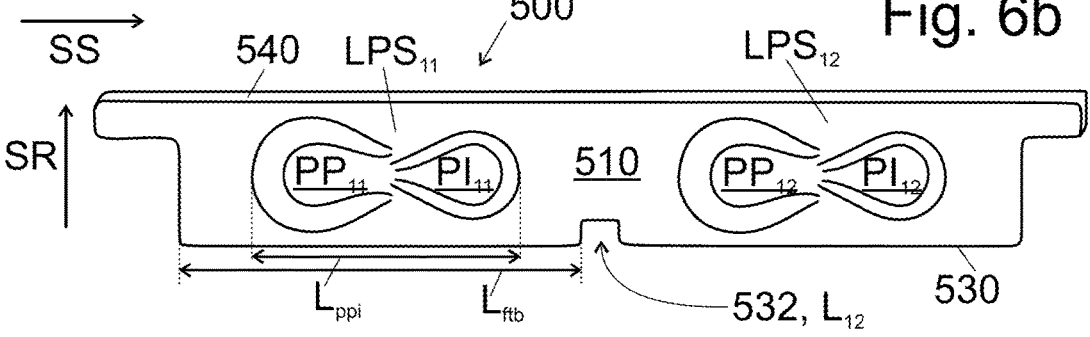
Figure 6C:
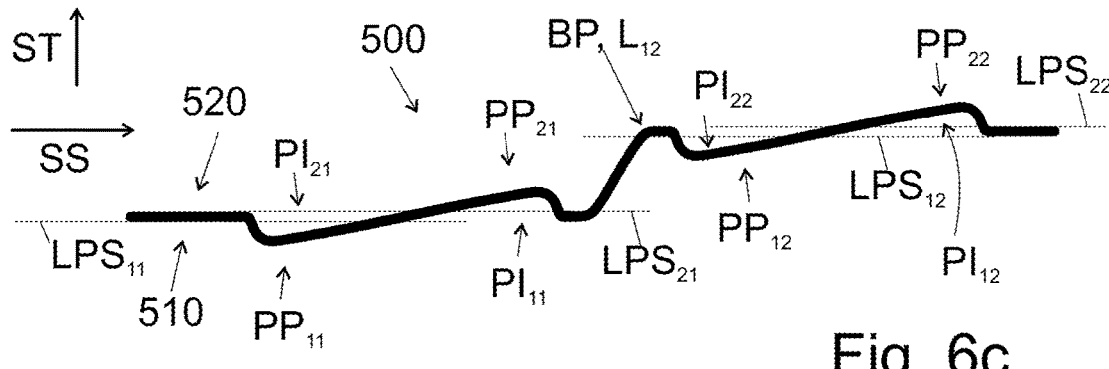
Figure 7A:
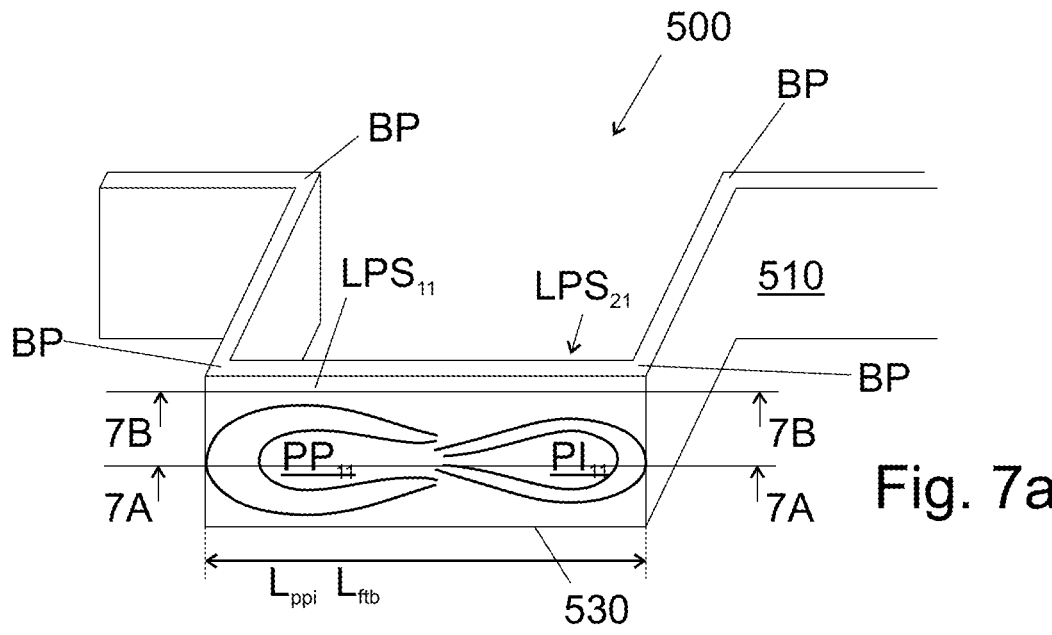
Figure 7B:
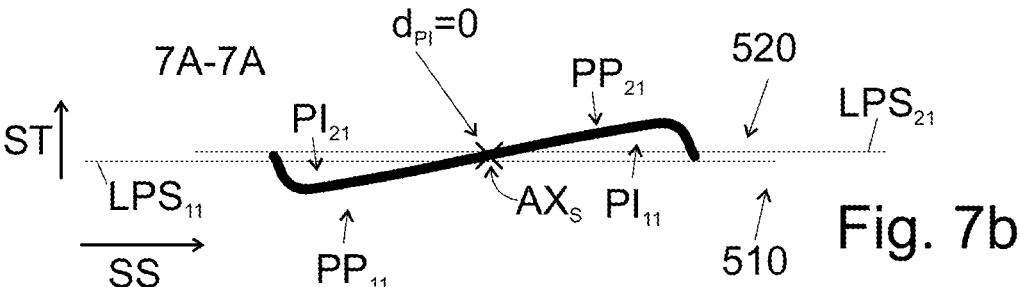
Figure 7C:
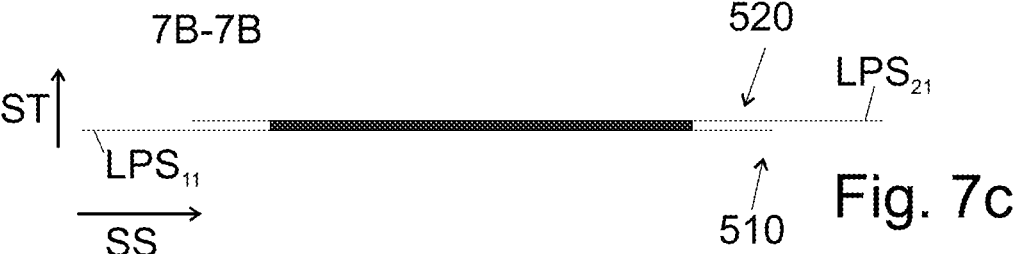
Figures 12A, 12B, 13, 14, 15, 16:
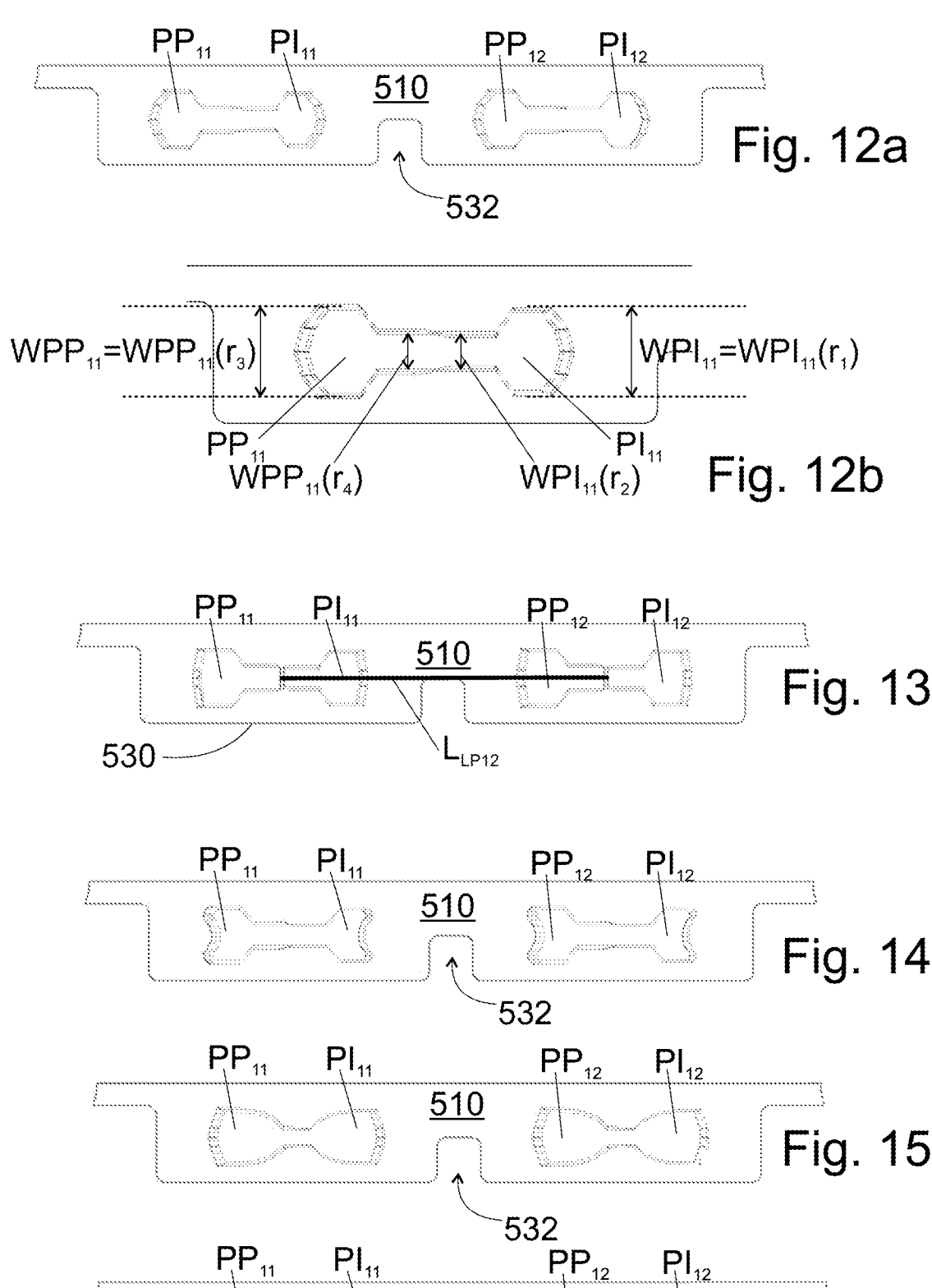
Figures 17, 18, 19, 20A, 20B:
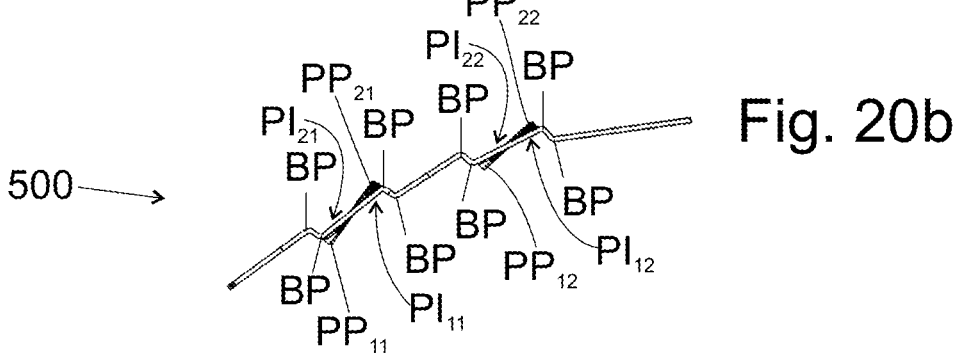

FIG. 1a shows a tire,

FIG. 1b shows a part of a tread of a tire, the tread comprising tread blocks separated from each other by grooves, and the tread blocks limiting sipes, FIG. 1c shows a cross section of a half of a tire, FIG. 2a shows a lamella plate in a side view, the lamella plate having a protrusion and an indentation on both sides, FIG. 2b shows the lamella plate of FIG. 2a with further measures and directions, FIG. 2c shows a cross section of a lamella plate in a top view, the cross section corresponding to a location wherein a depth of a plate indentation is at maximum, FIG. 2d shows another lamella plate with some measures, directions, and angles, FIG. 2e shows a cross section of a further lamella plate in a top view, the cross section corresponding to a location wherein a depth of a plate indentation is at maximum, FIG. 3a shows a tread block in a top view, FIG. 3b shows a part of a tread block having a sipe in a top view, FIG. 3c shows, a part of a cross section of tread block having a wall limiting the sipe, the cross section taken at certain depth from the tread, FIG. 3d shows a part of a cross section of tread block having a wall limiting the sipe, the cross section taken at certain depth from the tread, FIG. 4a shows a lamella plate in a side view, FIG. 4b shows a lamella plate in a side view, FIGS. 5a to 5c show a cross section of a lamella plate in a top view, the cross section corresponding to a location wherein a depth of a plate indentation is at maximum, FIG. 6a shows a lamella plate in a side view, the lamella plate having two protrusions and two indentations on both sides, FIG. 6b shows a lamella plate in a side view, the lamella plate having two protrusions and two indentations on both sides and a taper therein between, FIG. 6c shows a cross section of lamella plate in a top view, the cross section corresponding to a location wherein a depth of a plate indentation is at maximum, the lamella plate having two protrusions and two indentations on both sides and bent point therein between, FIG. 7a shows a lamella plate in a perspective view, the lamella plate having bend points, FIG. 7b shows a part of a cross section of lamella plate in a top view, the part of the cross section corresponding to a location wherein a depth of a plate indentation is at maximum, FIG. 7c shows a part of a cross section of lamella plate in a top view, the part of the cross section corresponding to a location wherein the lamella plate is free from a protrusion or indentation, FIGS. 8a to 8c show a lamella plate in a perspective view, in a side view, and in a top view, respectively, the lamella plate comprising a lamella plate surface having a shape of a planar surface, FIGS. 9a and 9b show a lamella plate in a side view and in a top view, respectively, FIGS. 10a and 10b show a lamella plate in a side view and in a top view, respectively, FIGS. 11$a$ to 11$e$ show a lamella plate in a perspective view, in a side view, and in a top view, respectively, the lamella plate comprising a lamella plate surface having a shape of a curved surface, FIG. 12$a$ shows a lamella plate in a side view, FIG. 12$b$ shows some measures of the lamella plate of FIG. 12$a$, FIGS. 13 to 19 show lamella plates in a side view, FIGS. 20$a$ and 20$b$ show a lamella plate in a perspective view and in a top view, respectively, the lamella plate comprising a lamella plate surface having a shape of a planar surface, and the lamella plate having multiple bend points, FIG. 21 shows symmetry of a wall protrusion with a wall indentation, FIG. 22 shows some directions of a pattern comprising a wall protrusion and a wall indentation, FIG. 23 shows inclining parts of a wall protrusion FIG. 24$a$ shows a wall having two protrusions and two indentations, FIG. 24$b$ shows a wall configured to be shape-locked to the wall of FIG. 24$a$ by two protrusions and two indentations, and FIG. 25 shows a part of a tread.

DETAILED DESCRIPTION OF THE INVENTION

The embodiments relate to a tire having tread blocks and a lamella plate for manufacturing a tire. The tire is preferably a pneumatic tire. At least some tread blocks are provided with sipes. To improve locking of sipe walls, opposite walls of a sipe, preferably opposite walls of many sipes, are provided with an indentation and a protrusion. Herein the term sipe refers to a narrow groove provided in a tread block of a tire. In between two parallel sipes, a lamella may be arranged. The term lamella refers to a narrow piece of tread block material in between two sipes. As an example, FIG. 1$b$ shows a lamella LAM in between the sipes $S_{11}$ and $S_{21}$. A lamella plate is a plate that is usable for forming a sipe in a moulding process. When a lamella plate is embedded to uncured rubber, and removed therefrom after curing the rubber, the sipe is formed.

In the present case, novel features of the tire 100 are derivable from the shape of the lamella plate 500 used for forming the sipe(s). Therefore, embodiments of a lamella plate 500 are defined first. As well known, because of the moulding process, a shape of the sipe formed by the lamella plate is geometrically congruent with the part of the lamella plate that is arranged in the tread of the tire during moulding.

FIG. 2$a$ shows, in a side view, a lamella plate 500 for forming a sipe to a tire. Somewhat similar lamella plate 500 is shown in FIG. 8$a$ in a perspective view; in FIG. 8$b$ in a side view; and in FIG. 8$c$ in a top view. FIG. 2$c$ shows the cross section A-A of FIG. 2$a$. Thus, referring to FIGS. 2$a$, 2$c$, and 8$a$ to 8$c$, the lamella plate 500 comprises a first surface 510 and a second surface that is opposite 520 to the first surface 510. The first surface 510 is provided with a first primary plate indentation $PI_{11}$ and a first primary plate protrusion $PP_{11}$. The first primary plate indentation $PI_{11}$ may have been made to a plate by pressing the indentation $PI_{11}$ thereto. Alternatively, the plate 500 may have been made by additive manufacturing. When manufacturing the tire 100, a part of the lamella plate 500 is arranged in a tread 110 of the tire such that the direction SR of FIG. 2$a$ is parallel to a radial direction SR of the tire (see FIG. 1$a$) at the point of the lamella plate 500. The directions SS and ST in FIG. 2$a$ are orthogonal to SR, and ST is a direction of a thickness of the lamella plate. This concerns also FIG. 2$c$.

As detailed above, a purpose of the invention is to lock walls of a sipe to each other during braking, acceleration, and/or driving on a curve. Braking and acceleration cause circumferential forces to the tire, and driving on a curve causes lateral forces to the tire. In this way, the locking of the walls of the sipes improves grip, stability, and handling of the tire. Therefore, and referring to FIG. 2$c$, the second surface 520 is provided with a second primary plate protrusion $PP_{21}$ that is opposite to the first primary plate indentation $PI_{11}$. The second surface 520 is also provided with a second primary plate indentation $PI_{21}$ that is opposite to the first primary plate protrusion $PP_{11}$.

In the lamella plate 500, the first surface 510 defines a first primary lamella plate surface $LPS_{11}$. In the embodiments shown e.g. in FIGS. 2$a$ to 2$d$ and 8$a$ to 8$c$, the first primary lamella plate surface $LPS_{11}$ has the shape of a planar surface. However, in the embodiment shown in FIGS. 11$a$ to 11$c$, the first primary lamella plate surface $LPS_{11}$ has the shape of a curved surface. The first surface 510 defines the first primary lamella plate surface $LPS_{11}$ such that the first surface 510 comprises the first primary lamella plate surface $LPS_{11}$.

The first primary plate protrusion $PP_{11}$ protrudes from the first primary lamella plate surface $LPS_{11}$ and the first primary plate indentation $PI_{11}$ descends into the first primary lamella plate surface $LPS_{11}$. Preferably, an area of the first primary lamella plate surface $LPS_{11}$ is at least 10%, more preferably at least 50%, of an area of the first primary plate protrusion $PP_{11}$. Preferably, an area of the first primary lamella plate surface $LPS_{11}$ is at least 10%, more preferably at least 50%, of an area of the first primary plate indentation $PI_{11}$.

In the lamella plate 500, the second surface 520 defines a second primary lamella plate surface $LPS_{21}$. In the embodiments shown e.g. in FIGS. 2$a$ to 2$d$ and 8$a$ to 8$c$, the second primary lamella plate surface $LPS_{21}$ has the shape of a planar surface. However, in the embodiment shown in FIGS. 11$a$ to 11$c$, the second primary lamella plate surface $LPS_{21}$ has the shape of a curved surface.

The second surface 520 defines the second primary lamella plate surface $LPS_{21}$ such that the second surface 520 comprises the second primary lamella plate surface $LPS_{21}$.

The second primary plate protrusion $PP_{21}$ protrudes from the second primary lamella plate surface $LPS_{21}$ and the second primary plate indentation $PI_{21}$ descends into the second primary lamella plate surface $LPS_{21}$.

Concerning the both the first primary lamella plate surface $LPS_{11}$ and second primary lamella plate surface $LPS_{21}$, both these surfaces may be planar surfaces. In the alternative, both these surfaces may be curved surfaces. Herein a curved surface refers to a planar surface that is obtainable by bending a plane about (i) an axis, (ii) axes that are parallel with each other and lying on only one side of the planar surface, or (iii) (iii,a) at least one primary axis, which is/are parallel with a primary direction and lying on a same side of the plane and (iii,b) at least one secondary axis, which is/are parallel with a secondary direction that is different from the primary direction, the secondary axes/axis lying mutually on a same side of the plane. The secondary axes may be arranged on a different side than the primary axes. Preferably, the first primary lamella plate surface $LPS_{11}$ and second primary lamella plate surface $LPS_{21}$ are planar or curved such that they are obtainable from a planar surface by bending about only one axis or by bending about only such axes that are parallel with each other and that are on a same side of the planar surface. Even more preferably, the first primary lamella plate surface $LPS_{11}$ and second primary lamella plate surface $LPS_{21}$ are planar or curved such that they are obtainable from a planar surface by bending about one axis or by bending about only such axes that are parallel with each other such that a radius of curvature about the axis/axes is constant throughout the lamella plate surfaces $LPS_{11}$, $LPS_{21}$.

It is noted that the lamella plate may be, but need not be, manufactured from a planar plate. As an alternative, a lamella plate may be manufactured using an additive manufacturing technique (including e.g. rapid prototyping and various sintering techniques). Thus, the shape of the first primary lamella plate surface $LPS_{11}$ and second primary lamella plate surface $LPS_{21}$ as disclosed above does not restrict the manufacturing method to a method comprising bending a plate.

In FIGS. 11a to 11c, the lamella plate surfaces $LPS_{11}$, $LPS_{12}$, $LPS_{21}$, and $LPS_{22}$ have such a curved shape that is obtainable from a planar surface by bending about only one axis, and the radius of curvature is constant. Naturally, when forming the plate, a planar plate may be bent in multiple process steps, but the resulting plate has a shape of being bent about only one axis such that the resulting radius of curvature is constant. Preferably, the first primary lamella plate surface $LPS_{11}$ and second primary lamella plate surface $LPS_{21}$, are either planar or curved surfaces in such a way that they are obtainable from a planar surface by bending about only one axis or axes that are parallel with each other. With reference to FIGS. 20a and 20b, the first primary lamella plate surface $LPS_{11}$ and second primary lamella plate surface $LPS_{21}$ may be planar even if the whole surfaces 510, 520 are not.

The surfaces 510, 520 having both a protrusion and an indentation has the effect that the walls of the sipe manufactured by the lamella plate 500 lock to each other well irrespective of the direction of the forces (forward or backward; or transversal forces to left or right). Correspondingly, the sipes function well both during acceleration and braking, and improve handling also when driving on a curve, curved to either direction.

In an embodiment, a thickness of the lamella plate 500 is constant at least in the regions defining the first primary plate indentation $PI_{11}$, the first primary plate protrusion $PP_{11}$, the second primary plate protrusion $PP_{21}$, and the second primary plate indentation $PI_{21}$. This has the effect that the second primary plate protrusion $PP_{21}$, which is opposite to the first primary plate indentation $PI_{11}$, is geometrically congruent with the first primary plate indentation $PI_{11}$. Moreover, the second primary plate indentation $PI_{21}$, which is opposite to the first primary plate protrusion $PP_{11}$, is geometrically congruent with the first primary plate protrusion $PP_{11}$. This improves the locking of the sipe walls to each other. More preferably, a thickness of the lamella plate 500 is constant at least in the regions defining the first primary plate indentation $PI_{11}$, the first primary plate protrusion $PP_{11}$, the second primary plate protrusion $PP_{21}$, the second primary plate indentation $PI_{21}$, the first primary lamella plate surface $LPS_{11}$, and the second primary lamella plate surface $LPS_{21}$. Naturally, the thickness of the whole lamella plate 500 may be constant. This is beneficial for manufacturing reasons. The thickness of the lamella plate 500 may be e.g. 0.2 mm to 3.0 mm; preferably 0.3 mm to 1.2 mm.

It has been found that the locking functions particularly well when the first primary plate indentation $PI_{11}$ is arranged close to the first primary plate protrusion $PP_{11}$. They may even contact each other, as shown in FIG. 2c. Therefore, in an embodiment, a minimum distance $d_{PI}$ between the first primary plate protrusion $PP_{11}$ and the first primary plate indentation $PI_{11}$ is at most 4 mm. The minimum distance $d_{PI}$ is preferably at most equal to a thickness of the lamella plate 500. The minimum distance $d_{PI}$ may be at most 2 mm or zero. These distances have the effect that the projection functions together with the closely neighbouring indentation in this way improving the locking effect. In an embodiment, the minimum distance $d_{PI}$ is arranged in a direction that is parallel to a projection line PR. The projection line PR is a projection of a of a line that remains between a centre of the first primary plate protrusion $PP_{11}$ and a centre of the first primary plate indentation $PI_{11}$, the projection being a normal projection to the first primary lamella plate surface $LPS_{11}$. Such a projection line PR is shown e.g. in FIG. 4a. The minimum distance $d_{PI}$ may be zero as in FIG. 2c. However, the protrusion $PP_{11}$ and the indentation $PI_{11}$ need not contact each other, whereby the distance may be greater, as shown in FIG. 2e. It is noted that FIG. 2e shows a protrusion and an indentation that do not incline towards each other, as detailed below. A somewhat similar shape is shown also in FIGS. 10a and 10b.

Referring to FIGS. 2b, 2c, and 2d, preferably, the first primary plate protrusion $PP_{11}$ is symmetric with the second primary plate protrusion $PP_{21}$ about an axis AXs. More precisely, in an embodiment, the first primary plate protrusion $PP_{11}$ is symmetric with the second primary plate protrusion $PP_{21}$ about an axis AXs such that, upon a rotation of 180 degrees about the axis AXs of symmetry, the first primary plate protrusion $PP_{11}$ coincides with the second primary plate protrusion $PP_{21}$ (unrotated). Herein the angle of 180 degrees is given with an accuracy of only two significant figures, because the curved surface (see FIGS. 11a to 11c) may have the effect that the angle is not precisely 180 degrees. Having this type of symmetry in the lamella plate 500 relates to the effect of locking the sipes in all directions that are parallel to the tread 110.

In case the first primary plate protrusion $PP_{11}$ is symmetric with the second primary plate protrusion $PP_{21}$ about an axis AXs, preferably, the axis AXs of symmetry is parallel or at least substantially parallel to a direction that, in the tire, is a radial direction. More specifically, preferably, [i] a direction of the axis AXs is parallel to a direction $d_R$ that is directed from a lower edge 530 of the lamella plate 500 to an opposite upper edge 540 (see FIG. 2b) or [ii] a direction of the axis AXs forms first angles ($\alpha_1$, $\alpha_2$) with a direction $d_R$ that is directed from a lower edge 530 of the lamella plate 500 to an opposite upper edge, wherein a minimum $\alpha_1$ of the first angles ($\alpha_1$, $\alpha_2$) is at most 30 degrees (see FIG. 2d). The direction $d_R$ is directed from the lower edge 530 of the lamella plate 500 to the opposite upper edge 540 along shortest possible path. A hole 550 may be arranged closer to the upper edge 540 than the lower edge 530 (see FIG. 22).

As for other characteristics of preferable shapes for the indentation $PI_{11}$ and protrusion $PP_{11}$, it is noted that the first primary plate protrusion $PP_{11}$ and the first primary plate indentation $PI_{11}$ define a projection line PR (see FIG. 4a) as defined above.

Preferably, the indentation $PI_{11}$ and protrusion $PP_{11}$ are arranged side-by-side rather than on top of each other. This improves handling of the tire under transversal load, e.g. driving in a curve. Referring to FIG. 4a, preferably, a direction of the projection line PR forms second angles $\beta_1$, $\beta_2$ with the direction $d_R$, wherein a minimum $\beta_1$ of the second angles $\beta_1$, $\beta_2$ is at least 60 degrees. Referring to FIG. 4a, the minimum $\beta_1$ of the second angles $\beta_1$, $\beta_2$ may be 90 degrees (one significant figure).

Referring to FIG. 4a, in a preferable embodiment, the first primary plate protrusion $PP_{11}$ is antisymmetric about all such planes $L_{AS}$ that have a normal that is parallel to the projection line PR. In other words, the first primary plate protrusion $PP_{11}$ is not symmetric about any such plane $L_{AS}$ that has a normal that is parallel to the projection line PR. It has been found that this improves handling of the tire under transversal load, e.g. driving in a curve. For similar reasons, in an embodiment, the first primary plate indentation $PI_{11}$ is antisymmetric about all such planes $L_{AS}$ that have a normal that is parallel to the projection line PR.

Referring to FIG. 4b, in an embodiment, the first primary plate protrusion $PP_{11}$ is symmetric about a plane $L_S$. As shown in FIG. 4b, a normal of the plane $L_S$ of symmetry may be parallel to the direction $d_R$ as defined above. However, it need not be parallel, as shown in FIG. 2d. In an embodiment, the first primary plate indentation $PI_{11}$ is symmetric about a plane. It may be symmetric about the same plane $L_S$. This type of symmetry has the effect that an outer part of the tread locks to a neighbouring sipe as well as an inner part of the tread. This has beneficial properties for handling the tire. More preferably, the first primary plate protrusion $PP_{11}$ is symmetric about a plane $L_S$ and the first primary plate indentation $PI_{11}$ is symmetric about the plane $L_S$. The plane $L_S$ of symmetry may comprise the projection line PR as defined above and a normal of the primary lamella plate surface $LPS_{11}$ as defined above.

It has also been found that the locking improves when there is a smooth transition from the protruding region of the first surface 510 to the declining region of the first surface 510. Therefore, and with reference to FIG. 5a, in an embodiment a part of a surface of the first primary plate protrusion $PP_{11}$ is inclined such that a height $hP_{11}(r)$ of the first primary plate protrusion $PP_{11}$, measured from the first primary lamella plate surface $LPS_{11}$, decreases towards the first primary plate indentation $PI_{11}$. Herein the height $hP_{11}(r)$ refers to the height as measured in a location r. Thus, the height $hP_{11}(r)$ decreases as the location r moves towards the first primary plate indentation $PI_{11}$ as shown in FIG. 5a. In contrast, the height $hP_{11}(r)$ could decrease to zero abruptly (within the limits of manufacturing tolerances of the lamella plate 500) as indicated in FIGS. 2e and 10b. A maximum of the height $hP_{11}(r)$ of the first primary plate protrusion $PP_{11}$ is, in an embodiment, from 0.5 mm to 4 mm.

When the height $hP_{11}(r)$ of the first primary plate protrusion $PP_{11}$ decreases towards the first primary plate indentation $PI_{11}$ the height $hP_{11}(r)$ preferably decreases such that a first inclination IN1 (see FIGS. 5b and 5c) defines a first inclination angle γ1 less than 45 degrees. The first inclination angle γ1 is an angle that remains between (i) a primary first line that remains between the point r of maximum height of the height $hP_{11}(r)$ of the first primary plate protrusion $PP_{11}$ and a center of the projection line PR as defined above and (ii) a secondary first line that is projection of the primary first line, the projection being a normal projection to the first primary lamella plate surface $LPS_{11}$. Reference is made to FIG. 5c. It has been found that if the first inclination angle γ1 was more, the locking effect would not be as good. Clearly, by the nature of the protrusion, the first inclination angle γ1 is greater than zero. Preferably, the first inclination angle γ1 is at least 2 degrees. The first inclination angle γ1 is shown in FIG. 5b.

As for an abrupt decrement of the height, an abrupt decrement can be quantified by a third inclination angle (not shown), which is for the abrupt change almost 90 degrees, e.g. at least 85 degrees.

Preferably, also the inclination of different sides of the protrusion $PP_{11}$ makes it antisymmetric as indicated above. Thus, in a preferable embodiment (see FIG. 5c), a first part R1 of a surface of the first primary plate protrusion $PP_{11}$ is inclined such that a height $hP_{11}(r)$ of the first primary plate protrusion $PP_{11}$ decreases from a maximal height towards the first primary plate indentation $PI_{11}$ by a first inclination IN1. As previously, the height $hP_{11}(r)$ is defined from the first primary lamella plate surface $LPS_{11}$. Moreover, a second part R2 of the surface of the first primary plate protrusion $PP_{11}$ is inclined such that the height $hP_{11}(r)$ of the first primary plate protrusion $PP_{11}$ decreases from the maximal height away from the first primary plate indentation $PI_{11}$ by a second inclination IN2. Moreover, the second inclination IN2 is different from the first inclination IN1. Preferably, the second inclination IN2 is steeper than the first inclination IN1, as depicted in FIG. 5c. This applies also to the second primary plate protrusion $PP_{21}$ mutatis mutandis (see FIG. 2c).

The second inclination IN2 defines a defines a second inclination angle γ2. The second inclination angle γ2 is an angle that remains between (i) a primary second line that remains between the point r of maximum height of the height $hP_{11}(r)$ of the first primary plate protrusion $PP_{11}$ and a point that is on a line that comprises the projection line PR the point being located at such a boundary of the first primary plate protrusion $PP_{11}$ that is opposite to a center of the projection line PR and (ii) a secondary second line that is projection of the primary second line, the projection being a normal projection to the first primary lamella plate surface $LPS_{11}$. Reference is made to FIG. 5c. Preferably, the second inclination angle γ2 is greater than the first inclination angle γ1. Preferably, also the second inclination is not abrupt. Thus, preferably, the second inclination angle γ2 is less than 85 degrees. The second inclination angle γ2 is shown in FIG. 5b.

Preferably a height of the lamella plate (i.e. a distance between the lower edge 530 and the upper edge 540) is more or less constant at least for the part that comprises the first primary plate indentation $PI_{11}$, the first primary plate protrusion $PP_{11}$, the second primary plate protrusion $PP_{21}$, and the second primary plate indentation $PI_{21}$. However, in case the lamella plate is for manufacturing a sipe for a shoulder are of the tire, the height of the lamella plate at one end may be less that the height of the lamella plate at another, opposite, end.

The height of the lamella plate 500 may decrease locally e.g. because of a taper 532 (see FIG. 6b). Such a taper may be arranged according to needs. A taper 532 may, e.g., ease bending of a plate. In a preferable embodiment, the lower edge 530 extends without a taper 532 for at least a portion overlapping each one of the first primary plate indentation $PI_{11}$, the first primary plate protrusion $PP_{11}$, the second primary plate protrusion $PP_{21}$, and the second primary plate indentation $PI_{21}$. Herein the term overlapping refers to overlapping in the direction $d_R$ as defined above. Moreover, the lower edge 530 is configured to be inserted into a tread 110 of a tire 100, while typically the opposite upper edge 540 is not configured to be inserted in to the tread at all. As two examples, the neither the taper 532 of FIG. 20a nor the taper 532 of FIG. 19 overlaps any protrusion or indentation in the direction $d_R$.

Herein the term "taper" refers to a groove limited by the lamella plate, the groove extending in the thickness of the lamella plate. Thus, the taper tapers the lamella plate, i.e. reduces locally its height.

The lamella plate 500 may also comprise a taper 532, e.g. when it has more protrusions. Referring to FIGS. 6b, 8a, 11a, and 20a, in an embodiment the lower edge 530 comprises a taper 532. However as shown in the figures, preferably the taper 532 does not overlap any one of the first primary plate indentation $PI_{11}$, the first primary plate protrusion $PP_{11}$, the second primary plate protrusion $PP_{21}$, and the second primary plate indentation $PI_{21}$. Referring to FIG. 6b, preferably, a length $L_{ftb}$ of the portion of the lower edge 530 that is free from a taper 532 is at most 50% greater than a length $L_{ppi}$ of projection of the first primary plate indentation $PI_{11}$, the first primary plate protrusion $PP_{11}$, the second primary plate protrusion $PP_{21}$, and the second primary plate indentation $PI_{21}$ to the lower edge 530. The lengths $L_{ppi}$ and $L_{ftb}$ may be substantially equal, as readable from FIG. 7a.

Preferably, at least a part of the first primary lamella plate surface $LPS_{11}$ is arranged between the upper edge 540 of the lamella plate 500 and both of the first primary plate indentation $PI_{11}$ and the first primary plate protrusion $PP_{11}$. This has the effect that a reasonably large portion of a wall of a sipe that is the outermost part of the tread has the shape of a plane or a curved surface. This improves traction of the tire, sine the edges of such sipes have an improved grip on the road.

Preferably, also at least a part of the first primary lamella plate surface $LPS_{11}$ is arranged between the lower edge 530 and both of the first primary plate indentation $PI_{11}$ and the first primary plate protrusion $PP_{11}$.

The projection line PR as defined above defines a direction SS of a length of the lamella plate 500, at least at the location of the projection PR line. Referring to FIG. 4a, in an embodiment, a length $RPI_{11}$ of the first primary plate indentation $PI_{11}$, as measured in the direction SS of a length of the lamella plate 500 is greater than a width $WPI_{11}$ of the first primary plate indentation $PI_{11}$, as measured in a direction that is perpendicular to the direction SS of the length of the lamella plate and perpendicular to a norm of the first primary lamella plate surface $LPS_{11}$. This has the effect that the first primary plate indentation $PI_{11}$ can be made relatively large, which improves the locking of the sipe walls. Preferably, the length $RPI_{11}$ of the first primary plate indentation $PI_{11}$ is at least 5% greater than the width $WPI_{11}$ of the first primary plate indentation $PI_{11}$. This applies also to the first primary plate indentation $PP_{11}$. Thus, in an embodiment, a length $RPP_{11}$ of the first primary plate protrusion $PP_1$ is greater than a width $WPP_{11}$ of the first primary plate protrusion $PI_{11}$, wherein the direction of length and width are defined as in the context of the indentation $PI_{11}$. Preferably, the length $RPP_{11}$ of the first primary plate protrusion $PP_{11}$ is at least 5% greater than the width $WPP_{11}$ of the first primary plate protrusion $PP_{11}$.

In an embodiment, the length $RPI_{11}$ of the first primary plate indentation $PI_{11}$ is from 1.5 mm to 20 mm, such as from 2.5 mm to 15 mm. In an embodiment, the length $RPP_{11}$ of the first primary plate protrusion $PP_{11}$ is from 1.5 mm to 20 mm, such as from 2.5 mm to 15 mm. In an embodiment, the length $RPP_{11}$ of the first primary plate protrusion $PP_{11}$ is equal to the length $RPI_{11}$ of the first primary plate indentation $PI_{11}$. In an embodiment, the width $WPP_{11}$ of the first primary plate protrusion $PP_{11}$ is equal to the width $WPI_{11}$ of the first primary plate indentation $PI_{11}$.

In an embodiment, a maximum of the width $WPI_{11}$ of the first primary plate indentation $PI_{11}$ is from 1.5 mm to 15 mm. In an embodiment, a maximum of the width $WPP_{11}$ of the first primary plate protrusion $PP_{11}$ is from 1.5 mm to 15 mm.

As for the width $WPI_{11}$ of the first primary plate indentation $PI_{11}$, preferably the first primary plate indentation $PI_{11}$ is narrower closer to the protrusion $PP_{11}$ than away from it. More specifically, and referring to FIGS. 12a and 12b, in an embodiment, the width $WPI_{11}(r)$ of the primary plate indentation $PI_{11}$ decreases towards the first primary plate protrusion $PP_{11}$. Referring to FIG. 12b, the width $WPI_{11}(r_1)$ of the first primary plate indentation $PI_{11}$ at a first location $r_1$, which is further away from the first primary plate protrusion $PP_{11}$ than a second location $r_2$, is greater than the width $WPI_{11}(r_2)$ of the primary plate indentation $PI_{11}$ at the second location $r_2$.

In an embodiment, this applies also to the first primary plate protrusion $PP_{11}$ mutatis mutandis. Thus, in an embodiment, a width $WPP_{11}(r)$ of the primary plate protrusion $PP_{11}$ decreases towards the first primary plate indentation $PI_{11}$. Referring to FIG. 12b, the width $WPP_{11}(r_3)$ of the first primary plate protrusion $PP_{11}$ at a third location $r_3$, which is further away from the first primary plate indentation $PI_{11}$ than a fourth location $r_4$, is greater than the width $WPP_{11}(r_4)$ of the first primary plate protrusion $PP_{11}$ at the fourth location $r_4$.

Referring to FIGS. 6c, 7a to 7c, and 20a and 20b, the whole lamella plate 500, excluding the protrusions and the indentations, need not have a shape of a plane or a curved surface. As indicated in FIGS. 6c, 7a, 20a, and 20b, the lamella plate 500 may comprise multiple bend points BP. In this case, the first primary lamella plate surface $LPS_{11}$ and the first secondary lamella plate surface $LPS_{12}$ may be arranged between two neighbouring bend points, and the protrusions $PP_{11}$, $PP_{21}$ may protrude therefrom and the indentations $PI_{11}$, $PI_{21}$ may descend thereto, as indicated in FIGS. 7a and 20a. Moreover, lengthwise, the protrusions $PP_{11}$, $PP_{21}$ and the indentations $PI_{11}$, $PI_{21}$ may use the whole length between the bend points BP. However, they need not. In this sense, the bend point BP may affect the length of the lower edge 530 in a similar way as a taper 532. Reference is made also to FIG. 6b and what has been said about the length of the lower edge 530. Thus, in an embodiment the lower edge 530 comprises a bend point BP. However, preferably the bend point BP does not overlap any one of the first primary plate indentation $PI_{11}$, the first primary plate protrusion $PP_{11}$, the second primary plate protrusion $PP_{21}$, and the second primary plate indentation $PI_{21}$. Preferably, a length $L_{ftb}$ of the portion of the lower edge 530 that is free from a bend point BP is at most 50% greater than a length $L_{ppi}$ of projection of the first primary plate indentation $PI_{11}$, the first primary plate protrusion $PP_{11}$, the second primary plate protrusion $PP_{21}$, and the second primary plate indentation $PI_{21}$ to the lower edge 530. The lengths $L_{ppi}$ and $L_{ftb}$ may be substantially equal.

In particular, if the lower edge 530 comprises bend points BP, it may comprise a taper 532 that overlaps the first primary plate indentation $PI_{11}$ or the first primary plate protrusion $PP_{11}$. Even in such a case, a length $L_{ftb}$ of the portion of the lower edge 530 that is free from a bend point BP is, in an embodiment, at most 50% greater than a length $L_{ppi}$ of projection of the first primary plate indentation $PI_{11}$, the first primary plate protrusion $PP_{11}$, the second primary plate protrusion $PP_{21}$, and the second primary plate indentation $PI_{21}$ to the lower edge 530. The lengths $L_{ppi}$ and $L_{ftb}$ may be substantially equal.

As indicated in FIGS. 7a and 7b, not even a part of the first primary lamella plate surface $LPS_{11}$ or the first secondary lamella plate surface $LPS_{12}$ needs to be arranged in between a bend point BP and a the protrusion $PP_{11}$ or the indentation $PI_{11}$. As indicated in FIGS. 7a and 7c, in such a case, at least a part of the first primary lamella plate surface $LPS_{11}$ may be arranged between the upper edge 540 and the protrusion/indentation and/or between the lower edge 530 and the protrusion/indentation.

Referring to FIGS. 6a-6c and 8a to 20b, the lamella plate 500 may comprise another protrusion and indentation. Thus, in an embodiment, the first surface 510 is provided with a first secondary plate indentation $PI_{12}$ and a first secondary plate protrusion $PP_{12}$. Correspondingly, the second surface 520 is provided with a second secondary plate protrusion $PP_{22}$ that is opposite to the first secondary plate indentation $PI_{12}$ and a second secondary plate indentation $PI_{22}$ that is opposite to the first secondary plate protrusion $PP_{12}$ (see FIG. 6c).

Moreover, the first surface 510 defines a first secondary lamella plate surface $LPS_{12}$ having the shape of a planar surface or a curved surface, from which the first secondary plate protrusion $PP_{12}$ protrudes and into which the first secondary plate indentation $PI_{12}$ descends. In addition, the second surface 520 defines a second secondary lamella plate surface $LPS_{22}$ having the shape of a planar surface or a curved surface, from which the second secondary plate protrusion $PP_{22}$ protrudes and into which the second secondary plate indentation $PI_{22}$ descends. What has been said about the area of the primary lamella plate surface $LPS_{11}$ applies, mutatis mutandis, to an area of the first secondary lamella plate surface $LPS_{12}$.

Referring to FIGS. 6a, 6b and 8a to 19, both the first primary lamella plate surface $LPS_{11}$ and the first secondary lamella plate surface $LPS_{12}$ may be a part of the same planar or curved surface. In a similar manner, both the second primary lamella plate surface $LPS_{21}$ and second secondary lamella plate surface $LPS_{22}$ may be a part of the same planar or curved surface. However, referring to FIGS. 6c and 20b, they need not be. In the embodiment of FIG. 6c, the lamella plate 500 comprises such bend points that the first primary lamella plate surface $LPS_{11}$ and the first secondary lamella plate surface $LPS_{12}$ are not part of the same curved surface in the conventional meaning of the term "curved surface". For a detailed definition of a curved surface, see above wherein the term is defined in connection with the first primary lamella plate surface $LPS_{11}$ and second primary lamella plate surface $LPS_{21}$. In the embodiment of FIG. 20b, the lamella plate 500 comprises such bend points that the first primary lamella plate surface $LPS_{11}$ and the first secondary lamella plate surface $LPS_{12}$ are planar, but not part of the same plane.

The embodiment of FIG. 6b shows a taper 532 that is arranged at a location $L_{12}$. The embodiment of FIG. 6b shows a bend point BP that is arranged at a location $L_{12}$. As indicated in these figures, the location $L_{12}$ of the taper 532 or bend point BP does not overlap a protrusion or an indentation in the meaning discussed above. In contrast, the location $L_{12}$ of the bend point BP or the taper 532 is arranged between [A] that one of the first secondary plate indentation $PI_{12}$ and the first secondary plate protrusion $PP_{12}$ that is closer to the first primary plate indentation $PI_{11}$ and [B] that one of the first primary plate indentation $PI_{11}$ and the first primary plate protrusion $PP_{11}$ that is closer to the first secondary plate indentation $PI_{12}$. However, in addition, the plate may comprise taper that overlaps a protrusion or an indentation in the meaning discussed above. However, preferably, a lamella plate does not comprise a taper that would overlap a protrusion or an indentation in the meaning discussed above.

Referring to FIG. 13, if the lamella plate comprises multiple protrusions/indentations, they are preferably arranged such that a direction of a line $L_{LP12}$ that runs (i) from a centre of a locking form defined by the first primary plate indentation $PI_{11}$ and a first primary plate protrusion $PP_{11}$ (ii) to a centre of a locking form defined by the first secondary plate indentation $PI_{12}$ and the first secondary plate protrusion $PP_{12}$ is substantially parallel to such a part of the lower edge 530 of the lamella plate 500 that comprises neither a taper 532 nor a bend point BP. In other words, the locking forms are preferably not arranged on top of each other in the direction that would be radial in the corresponding tire. The line $L_{LP12}$ may be parallel to the such a part of the lower edge 530 of the lamella plate 500 that comprises neither a taper 532 nor a bend point BP. In an embodiment, the smaller of the angles formed by the line $L_{LP12}$ with such a part of the lower edge 530 of the lamella plate 500 that comprises neither a taper 532 nor a bend point BP is at most 10 degrees.

Moreover, preferably the protrusions $PP_{11}$, $PP_{12}$ and the indentations $PI_{11}$ and $PI_{12}$ are arranged subsequently such that a protrusion is only arranged between two indentations and vice versa as in the Figures. Therefore, in an embodiment, [i] provided that a distance between the first primary plate indentation $PI_{11}$ and the first secondary plate indentation $PI_{12}$ is smaller than a distance between the first primary plate protrusion $PP_{11}$ and the first secondary plate indentation $PI_{12}$, a distance between the first primary plate indentation $PI_{11}$ and the first secondary plate protrusion $PP_{12}$ is smaller than a distance between the first primary plate indentation $PI_{11}$ and the first secondary plate indentation $PI_{12}$, and [ii] otherwise, a distance between the first primary plate protrusion $PP_{11}$ and the first secondary plate indentation $PI_{12}$ is smaller than a distance between the first primary plate protrusion $PP_{11}$ and the first secondary plate protrusion $PP_{12}$. However, the protrusions $PP_{11}$ and $PP_{12}$ may be arranged without any indentation in between them and/or the indentations $PI_{11}$ and $PI_{12}$ may be arranged without any protrusion in between them (not shown).

The lamella plate 500 as described above may be used to form a sipe of a tire 100. Multiple lamella plates may be used to form multiple sipes to a tread block or a sipe to multiple tread blocks or multiple sipes to multiple tread blocks, which is the most common way for making the sipes.

FIG. 1a shows a tire 100 comprising a tread 110. The tread 110 is formed of multiple tread blocks forming an arrangement 200 of tread blocks. The tire 100 is configured to form a rolling contact against a base 900 such as a road. Referring to FIG. 1b the arrangement 200 of tread blocks comprises a first tread block $TB_1$ and a second tread block $TB_2$. In general, the tread blocks define a groove 120 (and also other grooves) which are configured to guide water and slush away from a contact area of the tire 100. Thus, the first tread block $TB_1$ is separated from the second tread block $TB_2$ (and another tread block $TB_3$, $TB_4$) by a portion of the groove 120. FIG. 1c shows half of a cross section of a tire 100 and indicates the radial direction SR and the axial direction, i.e. the transversal direction (AX, ST) of the tire. The axial direction AX forms an axis of rotation of the tire 100.

The tread of the tire is formed of multiple tread blocks, including a first tread block $TB_1$ and a second tread block $TB_2$. Each tread block may comprise a number of sipes, such as a primary sipe and a secondary sipe. Thus e.g. a first tread block $TB_1$ may limit a primary first sipe $S_{11}$ and a secondary first sipe $S_{21}$, the "first" referring to an index of the tread block. Moreover, a (primary, secondary, etc.) sipe is arranged between two walls, the walls being comprised by the (first, second, etc.) tread block. These walls are called as first and second walls. When they concern e.g. a primary first sipe $S_{11}$, they are called a first primary first wall $W_{111}$ and a second primary first wall $W_{211}$.

Thus, referring to FIGS. 1*b* and 3*a*, the first tread block $TB_1$ is provided with sipes, including a primary first sipe $S_{11}$. The first tread block $TB_1$ may also limit a secondary first sipe $S_{21}$. A lamella LAM is arranged in between the sipes $S_{11}$ and $S_{21}$. The sipes are limited by side walls. Particularly, the primary first sipe $S_{11}$ is limited by a first primary first wall $W_{111}$ and an opposite second primary first wall $W_{211}$ as indicated in FIG. 3*b*. These walls are provided in the first tread block $TB_1$. As readable from above, the walls $W_{111}$ and $W_{211}$ have been made by a lamella plate 500 as detailed above. Referring to FIGS. 2*c* and 3*d*, the first primary first wall $W_{111}$ may have been made by the first surface 510 of a lamella plate 500. Correspondingly, referring to FIGS. 2*c* and 3*c*, the second primary first wall $W_{211}$ may have been made by the second surface 520 of a lamella plate 500. Moreover, outside the location of a lamella plate, the tread block may be integral (i.e. without a sipe). This is shown by the text "no sipe here" in FIG. 22. As indicated in FIG. 22, in use, an upper edge 540 of a lamella plate 500 may protrude from the tread 110 partly formed by the tread block $TB_1$. Moreover, a lamella plate 500 may be provided with holes 550 close to the upper edge 540 to help the removal of the lamella plate from the tread 110. Such holes are also shown in FIG. 20*a*. Also other embodiments of lamella plates may comprise similar holes 550.

Therefore, referring to FIG. 3*b*, the first tread block $TB_1$ comprises a first primary first wall $W_{111}$ and a second primary first wall $W_{211}$ such that a primary first sipe $S_{11}$ is arranged between the first primary first wall $W_{111}$ and the second primary first wall $W_{211}$. Because of the shape of the lamella plate 500, the first primary first wall $W_{111}$ is provided with a first primary first wall indentation $WI_{111}$ and first primary first wall protrusion $WP_{111}$ as shown in FIG. 3*d*. These correspond to the first primary plate protrusion $PP_{11}$ and the first primary plate indentation $PI_{11}$ of the lamella plate 500, respectively (see FIGS. 3*d* and 2*c*). Moreover, the second primary first wall $W_{211}$ is provided with a second primary first wall indentation $WI_{211}$ and second primary first wall protrusion $WP_{211}$. These correspond to the second primary plate protrusion $PP_{21}$ and the second primary plate indentation $PI_{21}$ of the lamella plate 500, respectively (see FIGS. 3*c* and 2*c*).

Moreover, the first primary first wall $W_{111}$ comprises (i.e. defines) a first primary first wall surface $WS_{111}$ having the shape of a planar surface or a curved surface, from which the first primary first wall protrusion $WP_{111}$ protrudes and into which the first primary first wall indentation $WI_{111}$ descends (see FIGS. 3*d* and 22). This corresponds to the first primary lamella plate surface $LPS_{11}$ of the lamella plate 500. The second primary first wall $W_{211}$ comprises (i.e. defines) a second primary first wall surface $WS_{211}$ having the shape of a planar surface or a curved surface, from which the second primary first wall protrusion $WP_{211}$ protrudes and into which the second primary first wall indentation $WI_{211}$ descends (see FIG. 3*c*). This corresponds the second primary lamella plate surface $LPS_{21}$ of the lamella plate 500.

Moreover, to provide for the locking of the walls $W_{111}$, $W_{211}$ together during braking or acceleration or driving on a curve, the first primary first wall indentation $WI_{111}$ is geometrically congruent with the second primary first wall protrusion $WP_{211}$ and the first primary first wall protrusion $WP_{111}$ is geometrically congruent with the second primary first wall indentation $WI_{211}$. They are also arranged such that upon compressing the first primary first wall $W_{111}$ and the second primary first wall $W_{211}$ to each other, the second primary first wall protrusion $WP_{211}$ penetrates into the first primary first wall $W_{111}$; and the first primary first wall protrusion $WP_{111}$ penetrates into the second primary first wall indentation $WI_{211}$. This can be achieved at least when a thickness of the lamella plate 500 is constant at least in the regions defining the first primary plate indentation $PI_{11}$, the first primary plate protrusion $PP_{11}$, the second primary plate protrusion $PP_{21}$, and the second primary plate indentation $PI_{21}$; as discussed above.

As for the term sipe, a width of the sipe corresponds to a thickness of the lamella plate 500. Therefore, in an embodiment, a width of the primary first sipe $S_{11}$ is from 0.2 mm to 3.0 mm, preferably from 0.3 mm to 1.2 mm. A readable from FIG. 3*b*, the width of the primary first sipe $S_{11}$ remains between the first primary first wall $W_{111}$ and the second primary first wall $W_{211}$.

As indicated in connection with the lamella plate, in an embodiment, a minimum distance between the first primary first wall indentation $WI_{111}$ and the first primary first wall protrusion $WP_{111}$ is at most 4 mm. This corresponds the distance $d_{PI}$ of the lamella plate (see FIGS. 2*c* and 2*e*). The minimum distance between the first primary first wall indentation $WI_{111}$ and the first primary first wall protrusion $WP_{111}$ may be e.g. at most equal the width of the primary first sipe $S_{11}$, such as at most 2 mm or zero; i.e. the protrusion $WP_{111}$ may start at a location where the indentation $WI_{111}$ ends.

As indicated in connection with the lamella plate, therein the first primary plate protrusion $PP_{11}$ may be symmetric with the second primary plate protrusion $PP_{21}$ about an axis AXs. If so, this shows also in the walls $W_{111}$, $W_{211}$ of the first tread block $TB_1$. Thus and with reference to FIG. 21, in an embodiment, a first form FWP that is symmetric with the first primary first wall protrusion $WP_{111}$ about a first symmetry plane $SP_1$ is symmetric with the first primary first wall indentation $WI_{111}$ about a second symmetry plane $SP_2$, the second symmetry plane $SP_2$ being perpendicular to the first symmetry plane $SP_1$. The first symmetry plane $SP_1$ intersects the second symmetry plane $SP_2$. The intersection of these planes forms a line, which is parallel to the axis AXs; at least when a part of the lamella plate 500 has been inserted into the tread to form the wall protrusions and indentations as detailed above.

Referring to FIG. 22, the first primary first wall protrusion $WP_{111}$ the first primary first wall indentation $WI_{111}$ of the first primary first wall $W_{111}$ define a projection line $PR_W$ on the wall (i.e. a wall projection line $PR_W$), the projection line $PR_W$ on the wall being a projection of a line that remains in between a centre of the first primary first wall protrusion $WP_{111}$ and a centre of the first primary first wall indentation $WI_{111}$, the projection being a normal projection to the first primary first wall surface $WS_{111}$.

As shown in FIG. 22, the first primary wall $W_{111}$ is a wall of the first tread block $TB_1$, which defines a part of the tread 110 (see FIGS. 1 and 2). Referring to FIG. 22, in an embodiment, the projection line $PR_W$ on the wall is parallel to the tread 110. However, it need not be. Considering FIG. 2*d* and its effects on the tire 100, in an embodiment, the projection line $PR_W$ on the wall forms a minimum angle with the tread 110, and the minimum angle is at most 30 degrees. This relates to the angle $\alpha_1$ defined above. It is noted that the tread 110 is a surface, and, as conventional, an angle between a line (e.g. $PR_W$) with a plane is defined as the minimum angle between these.

As indicated in connection with the lamella plate, in an embodiment, the first primary first wall protrusion $WP_{111}$ is antisymmetric about all such planes $W_{AS}$ that have a normal that is parallel to the projection line $PR_W$ on the wall (i.e. the wall projection line $PR_W$) as defined above. Reference is made to FIG. 22. This may apply also to the primary first wall indentation $WI_{111}$ mutatis mutandis. Therefore, in an embodiment, the first primary first wall indentation $WI_{111}$ is antisymmetric about all such planes $W_{AS}$ that have a normal that is parallel to the projection line $PR_W$ on the wall (i.e. the wall projection line $PR_W$) as defined above.

Referring still to FIG. 22, in an embodiment, the first primary first wall protrusion $WP_{111}$ is symmetric about a plane. In an embodiment, the first primary first wall indentation $WI_{111}$ is symmetric about another plane or the same plane. In an embodiment, both the first primary first wall protrusion $WP_{111}$ and the first primary first wall indentation $WI_{111}$ are symmetric about a plane. Referring to FIG. 22, the plane of symmetry may comprise the wall projection line $PR_W$. The plane of symmetry is not shown in FIG. 22; instead, reference is made to FIG. 4b and the plane $L_S$.

Referring particularly to FIG. 5c, the first primary plate protrusion $PP_{11}$ may comprise inclined areas. This concerns also the indentations $PI_{11}$, $PI_{21}$ of the lamella plate and, correspondingly, the protrusion $PP_{21}$ the lamella plate (see FIG. 5c) mutatis mutandis.

This shows also in the protrusions/indentations of the tire, as reproduced in FIG. 23. Referring to FIG. 23, in an embodiment, a part of a surface of the first primary first wall protrusion $WP_{111}$ is inclined such that a height $hWP_{111}(r)$ of the first primary first wall protrusion $WP_{111}$, measured from the first primary first wall surface $WS_{111}$, decreases towards the first primary first wall indentation $WI_{111}$. A maximum of the height $hWP_{111}(r)$ of the first primary first wall protrusion $WP_{111}$ is, in an embodiment, from 0.5 mm to 4.0 mm. Correspondingly, a maximum of a depth of the first primary first wall indentation $WI_{111}$ is, in an embodiment, from 0.5 mm to 4.0 mm. The depth is defined from the first primary first wall surface $WS_{111}$.

More preferably, a first part of a surface of the first primary wall protrusion $WP_{111}$ is inclined such that a height $hWP_{111}(r)$ of the first primary wall protrusion $WP_{111}$, measured from the first primary first wall surface $WS_{111}$, decreases from a maximal height towards the first primary first wall indentation $WI_{111}$ by a third inclination. In addition, a second part of a surface of the first primary wall protrusion $WP_{111}$ is inclined such that a height $hWP_{111}(r)$ of the first primary wall protrusion $WP_{111}$, measured from the first primary first wall surface $WS_{111}$, decreases from a maximal height away from the first primary first wall indentation $WI_{111}$ by a fourth inclination, wherein the fourth inclination is different from the third inclination. Even more preferably, the fourth inclination is steeper than the third inclination, as depicted in FIG. 23. This applies also to the second primary first wall protrusion $WP_{211}$ of the other wall $W_{211}$ of the sipe mutatis mutandis.

As readable from above, in an embodiment, the third inclination corresponds to the first inclination IN1 of the lamella plate 500. In an embodiment, the fourth inclination corresponds to the second inclination IN2 of the lamella plate 500. Thus, an inclination angle of the third inclination may be 2 to 45 degrees as disclosed in connection with the lamella plate and the first inclination angle γ1. Moreover, an inclination angle of the fourth inclination may be greater than the inclination angle of the third inclination and less than 85 degrees as disclosed in connection with the lamella plate and the second inclination angle γ2. What has been said about the definition of the inclination angles γ1 and γ2 in connection with the lamella plate 500 applies to inclination angles of the walls of the sipe mutatis mutandis.

As for preferable measures of the wall protrusion/indentation, in an embodiment and with reference to FIG. 22, a length $LWP_{111}$ of the first primary first wall protrusion $WP_{111}$, as measured in the direction of wall projection line $PR_{111}$ is greater than a width of the first primary first wall protrusion $WP_{111}$. The width is defined in a direction that is perpendicular to the direction of wall projection line $PR_W$ and perpendicular to a norm of the first primary first wall surface $WS_{111}$. In FIG. 22, the width would be defined in the direction SR which is perpendicular to the tread 110. However, the wall projection line $PR_W$ needs not be parallel to the tread 110.

In an embodiment, the length $LWP_{111}$ of the first primary first wall protrusion $WP_{111}$ is from 1.5 mm to 20 mm, such as from 2.5 mm to 15 mm. Preferably, the length $LWP_{111}$ of the first primary first wall protrusion $WP_{111}$ is at least 5% greater than the width of the first primary first wall protrusion $WP_{111}$.

Preferably, a width of the first wall protrusion $WP_{111}$ decreases towards the first primary first wall indentation $WI_{111}$, the width of the first wall protrusion $WP_{111}$ being perpendicular to the length of the first wall protrusion $WP_{111}$. Preferably, a width of the first wall indentation $WI_{111}$ decreases towards the first primary first wall protrusion $WP_{111}$, the width of the first wall indentation $WI_{111}$ being perpendicular to the length of the first wall indentation $WI_{111}$.

A maximum of the width of the first wall protrusion $WP_{111}$ may be 1.5 mm to 15 mm. A maximum of the width of the first wall indentation $WI_{111}$ may be 1.5 mm to 15 mm.

As indicated above, the first primary first wall $W_{111}$ is configured to lock with the second primary first wall $W_{211}$. To this end, the protrusion and indentation, in combination, define a locking shape to enable the locking. More precisely, the first primary first wall indentation $WI_{111}$ and the first primary first wall protrusion $WP_{111}$ form a first locking form, which is arranged on the first primary first wall $W_{111}$; and the second primary first wall protrusion $WP_{211}$ and the second primary first wall indentation $WI_{211}$ form a second locking form, which is arranged on the second primary first wall $W_{211}$. The second locking form is geometrically congruent with the first locking form to enable a shape-locking mechanism of the second locking form to the first locking form upon pressing the first primary first wall $W_{111}$ and the second primary first wall $W_{211}$ together.

As detailed in connection with a lamella plate 500, the lamella plate 500 may comprise a bend point BP or a taper 532. It is noted that the lower edge 530 of the lamella plate 500 defines a bottom of the sipe, particularly the primary first sipe $S_{11}$. If the lower edge 530 of the lamella plate 500 comprises a taper, the bottom of the primary first sipe $S_{11}$ comprises a corresponding bottom protrusion (not shown). In line with what has been said about the lamella plate 500, in an embodiment, such a part of a bottom of the primary first sipe $S_{11}$ that is arranged below the first and second locking forms does not comprise a bend point or a bottom protrusion. If the primary first sipe $S_{11}$ comprises a bend point and/or a bottom protrusion that/they is/are preferably arranged to another place than below the locking forms defined by the wall protrusions/indentations. However, such a part of a bottom of the primary first sipe $S_{11}$ that is arranged below the first and second locking forms may comprise a bottom protrusion, even if the first and second locking forms are arranged between two bend points.

A shape of a projection of the first locking form to the first primary first wall surface $WS_{111}$ may resemble one of the following: an infinity sign, a bowtie, a dog bone, a double ended arrow, a rectangle, and a rounded rectangle. As for the locking form of the sipe of the tire $100$, this concerns the locking form formed by first primary first wall indentation $WI_{111}$ and the first primary first wall protrusion $WP_{111}$. As for the locking form of the lamella plates, this concerns a locking form formed by the first primary plate indentation $PI_{11}$ and the first primary plate protrusion $PP_{11}$.

The shape of the first and second locking forms are derivable from the shape of the indentations/protrusions of the lamella plate $500$. For example, the FIGS. $2a$-$2e$, $4a$, $4b$, $6a$, $6b$, $7a$, and $8a$-$11c$ show a shape that resembles an infinity sign. FIGS. $12a$ and $12b$ show a shape that resembles a double ended arrow. FIG. $13$ shows a shape that resembles both a bowtie and a double ended arrow. FIG. $14$ shows a shape that resembles a dog bone. FIGS. $15$ and $16$ show shapes that resemble bowties. FIGS. $17$ and $18$ show shapes that resemble rounded rectangles. FIG. $19$ shows a shape that resembles a rectangle.

However, it has been found that the shape of a rectangle does not function as well as the others. Thus, in an embodiment, a shape of a projection of the first locking form to the first primary first wall surface $WS_{111}$ does not resemble a rectangle or a rounded rectangle. As for the locking form of the sipe of the tire $100$, this concerns the locking form formed by first primary first wall indentation $WI_{111}$ and the first primary first wall protrusion $WP_{111}$. As for the locking form of the lamella plates, this concerns the locking form formed by the first primary plate indentation $PI_{11}$ and the first primary plate protrusion $PP_{11}$, and the shape of the locking form as projected onto the first primary lamella plate surface ($LPS_{11}$). Thus, in the embodiment, a shape of a projection of the first locking form to the to the first primary first wall surface $WS_{111}$ resembles one of the following: an infinity sign, a bowtie, a dog bone, and a double ended arrow.

As discussed above, the primary first sipe $S_{11}$ is producible in a moulding process by using a lamella plate $500$ as described above. Referring to FIG. $1b$, in an embodiment, first tread block $TB_1$ comprises a secondary first sipe $S_{21}$ that is producible in a moulding process by using a lamella plate $500$ as described above. Referring to FIGS. $1a$ and $1b$, in an embodiment, the tire $100$ comprises a second tread block $TB_2$ that comprises a primary second sipe $S_{12}$ that is producible in a moulding process by using a lamella plate $500$ as discussed above. Referring to FIGS. $1a$ and $1b$, in an embodiment, the second tread block $TB_2$ comprises a secondary second sipe $S_{22}$ that is producible in a moulding process by using a lamella plate $500$ as discussed above.

As an example, the lamella plate may comprise at least two protrusions on each surface $510$, $520$, as detailed e.g. in FIGS. $8a$ to $20b$. Corresponding walls are shown in FIGS. $24a$ and $24b$. As detailed in FIG. $24b$ in an embodiment, the first primary first wall $W_{111}$, which is provided with the first primary first wall indentation $WI_{111}$ and first primary first wall protrusion $WP_{111}$, is further provided with a secondary first primary first wall indentation $WI_{2111}$ and secondary first primary first wall protrusion $WP_{2111}$. In general, a wall may be provided with a wall protrusion $WP_{ijkl}$ wherein l is an index of the tread block, k is an index of a sipe in that tread block, j is an index (1 or 2) of a wall of that sipe, and i is an index of the protrusion. In the above only three indexes are used in case a wall is discussed only in connection with one protrusion, whereby the index i=1 has been omitted. However, there may be several protrusions/indentation on a wall, even if the figures who lamella plates with at most two locking forms. As well known, the number of tread blocks in a tire may be huge (corresponding to index 1). Typically a tread block, if comprises sipes, comprises 2 to 4 sipes, but may comprise also any other number of sipes, such as 1 to 8 (corresponding to index k). In a similar manner a wall may be provided with a wall indentation $WI_{ijkl}$.

Moreover, the first primary first wall $W_{111}$ defines a secondary first primary first wall surface $WS_{2111}$ having the shape of a planar surface or a curved surface, from which the secondary first primary first wall protrusion $WP_{2111}$ protrudes and into which the secondary first primary first wall indentation $WI_{2111}$ descends (see FIG. $24b$).

As detailed in FIG. $24a$ in an embodiment, the second primary first wall $W_{211}$, which is provided with a second primary first wall indentation $WI_{211}$ and second primary first wall protrusion $WP_{211}$, is further provided with a secondary second primary first wall indentation $WI_{2211}$ and secondary second primary first wall protrusion $WP_{2211}$. Moreover, the second primary first wall $W_{211}$ defines a secondary second primary first wall surface $WS_{2211}$ having the shape of a planar surface or a curved surface, from which the secondary second primary first wall protrusion $WP_{2211}$ protrudes and into which the secondary second primary first wall indentation $WI_{2211}$ descends (see FIG. $24a$).

Referring to FIG. $24b$, when the first primary first wall $W_{111}$ comprises the secondary first primary first wall indentation $WI_{2111}$ and the secondary first primary first wall protrusion $WP_{2111}$, these are preferably arranged such that a direction of a line $L_{WP12}$ that runs (i) from a centre of the locking form defined by the first primary first wall indentation $WI_{111}$ and the first primary first wall protrusion $WP_{111}$(ii) to a centre of a locking form defined by the secondary first primary first wall indentation $WI_{2111}$ and the secondary first primary first wall protrusion $WP_{2111}$ is substantially parallel to the tread $110$. In other words, the locking forms are preferably not arranged on top of each other in the radial direction SR. The line $L_{WP12}$ may be parallel to the tread $110$. In an embodiment, a minimum angle formed by the line $L_{WP12}$ with respect to the tread $110$ is at most 10 degrees.

This applies, mutatis mutandis, to the lamella plate $500$, too, as discussed above.

In an embodiment, the first tread block $TB_1$ is provided with a secondary first sipe $S_{21}$. The secondary first sipe $S_{21}$ is limited by walls $W_{121}$ and $W_{221}$ of the first tread block. The wall $W_{121}$ may be provided with a wall protrusion $WP_{121}$ and a wall indentation $WI_{121}$. The wall $W_{221}$ may be provided with a wall protrusion $WP_{221}$ and a wall indentation $WI_{221}$. The walls $W_{121}$ and $W_{221}$, the wall protrusions $WP_{121}$ and $WP_{221}$ and the wall indentations $W_{121}$ and $WI_{221}$ may have been formed by a lamella plate as disclosed above.

Thus, in between the primary first sipe $S_{11}$ and secondary first sipe $S_{21}$, a narrow piece of rubber material, i.e. a lamella LAM (see FIG. $1b$), is arranged. A thickness of the lamella LAM may be e.g. 1 to 10 mm. Because both the sipes $S_{11}$ and $S_{21}$ have been provided with the locking shape as discussed above, also the lamella locks to other parts of the first tread block $TB_1$ on both sides of the lamella. This also improves grip, stability, and handling. Such sipes are shown in FIGS. $1b$ and $3a$.

In an embodiment, the tire comprises a second tread block TB2 is provided with a primary second $S_{12}$ and a secondary second sipe $S_{22}$ (see FIG. $1b$). Both the primary second $S_{12}$ and a secondary second sipe $S_{22}$ may have been made by a lamella plate $500$ as discussed above. Thus, the primary second sipe $S_{12}$ is limited by walls $W_{112}$ and $W_{212}$ of the second tread block $TB_2$. The wall $W_{112}$ may be provided with a wall protrusion $WP_{112}$ and a wall indentation $WI_{112}$. The wall $W_{212}$ may be provided with a wall protrusion $WP_{212}$ and a wall indentation $WI_{212}$. Moreover, the secondary second sipe $S_{22}$ is limited by walls $W_{122}$ and $W_{222}$ of the second tread block $TB_2$. The wall $W_{122}$ may be provided with a wall protrusion $WP_{122}$ and a wall indentation $WI_{122}$. The wall $W_{222}$ may be provided with a wall protrusion $WP_{222}$ and a wall indentation $WI_{222}$. What has been said about the wall protrusion and indentation in connection with the primary first sipe $S_{11}$ applies.

Thus, in between the primary second sipe $S_{12}$ and secondary second sipe $S_{22}$, a narrow piece of rubber material, i.e. a lamella, is arranged. A thickness of the lamella may be within the same range as disclosed for the lamella LAM. Because both the sipes $S_{12}$ and $S_{22}$ have been provided with the locking shape as discussed above, also the lamella locks to other parts of the second tread block $TB_2$ on both sides of the lamella. This also improves grip and handling. Such sipes are shown in FIG. 1$b$.

The sipes discussed above may be used in winter tires or in summer tires. A hardness of a tread material of a summer tire is typically in the range 60 to 72 Sh(A), i.e. hardness of measured by the Shore scale, durometer type A at the temperature 23° C.

However, sipes are preferably used in wither tires for the reason discussed above. However, in winter tires, preferably also the tread material per se is reasonably soft. A hardness of a tread material of a winter tire is typically in the range 48 to 59 Sh(A).

Therefore, in an embodiment, the tread blocks ($TB_1$, $TB_2$, $TB_3$, $TB_4$) of the tread block arrangement 200 are made of rubber having the hardness 48 to 72 Sh(A). Preferably, the tread blocks ($TB_1$, $TB_2$, $TB_3$, $TB_4$) of the tread block arrangement 200 are made of rubber having the hardness 48 to 59 Sh(A).

A tire 100 having the tread block arrangement 200 as described above, may comprise a first marking 152 (see FIG. 1$a$) indicative of the tire 100 being suitable for use as a winter tire. A groove pattern of a winter tire is typically such that a direction of rotation of the tire 100 is defined for driving forward. Therefore, in an embodiment, the tire 100 comprises a second marking 154 indicative of a direction of rotation of the tire when driving forward.

A groove pattern refers to a pattern formed by grooves of the tire. Like a sipe, a groove is a valley in the tread, however, a width of a groove is typically much larger than that of a sipe. Grooves define the tread blocks by separating tread blocks from each other. A groove has a depth and a width. Typically, a depth of a groove is at least 6 mm, such as at least 8 mm, such as from 6 mm to 50 mm. However, the depth needs not be constant. Moreover, near sidewalls of a tire, a depth of a groove may be very small. In fact, the depth may decrease to zero towards the sidewall, depending on the shape of the shoulder area of the tire. Typically, a width of a groove is more than 3 mm, such as more than 4 mm. However, at or near a central area of the tread, a width of a groove may be less. In a central area of the tread, a width of a groove may be e.g. 1.5 mm or more.

Referring to FIG. 25, to further improve grip, the tread 110 may be provided with studs 250. Such studs 250 improve friction on icy roads. However, the tread 110 formed by the tread block arrangement 200 is also applicable as a tread of a studless tire. A studless tire may be a summer tire or a winter tire. The tread block arrangement 200 may limit an indicator 240 indicative of depth of the groove 120 (i.e. a wear indicator of the tire 100). The indicator 240 may also be indicative of the of the groove 120 having a depth that is sufficient or insufficient for driving on a snowy road.

The embodiments described herein that relate to a tire 100 refer to an unworn tire 100. It is understood that, in use, a tire 100 wears, which may affect the depth of its sipes and/or grooves. Such an unworn tire may comprise a pattern 260 (see FIG. 25) indicative of the tire being not used. The pattern 260 may be e.g. a portion of the tread 110 having fine protrusions and/or indentations that are indicative of the tire 100 unused, i.e. unworn.

The invention claimed is:

1. A tire comprising:
a tread provided with a first tread block separated from another tread block by a portion of a groove, wherein:
the first tread block comprises:
a first primary first wall; and
a second primary first wall such that a primary first sipe is arranged between the first primary first wall and the second primary first wall; wherein:
the first primary first wall is provided with a first primary first wall indentation and first primary first wall protrusion,
the second primary first wall is provided with a second primary first wall indentation and a second primary first wall protrusion,
the first primary first wall defines a first primary first wall surface having a planar surface or a curved surface, from which the first primary first wall protrusion protrudes and into which the first primary first wall indentation descends,
the second primary first wall defines a second primary first wall surface having a planar surface or a curved surface, from which the second primary first wall protrusion protrudes and into which the second primary first wall indentation descends,
the first primary first wall indentation is geometrically congruent with the second primary first wall protrusion,
the first primary first wall protrusion is geometrically congruent with the second primary first wall indentation,
the first primary first wall protrusion is asymmetric about all planes that have a normal that is parallel to a wall projection line, which is a projection of a line that remains in between a center of the first primary first wall protrusion and a center of the first primary first wall indentation, the projection being a normal projection to the first primary first wall surface,
a first part of a surface of the first primary wall protrusion is inclined so that a height of the first primary wall protrusion, as measured from the first primary first wall surface, decreases from a maximal height towards the first primary first wall indentation by a first inclination,
a second part of the surface of the first primary wall protrusion is inclined so that a height of the first primary wall protrusion, as measured from the first primary wall surface, decreases from the maximal height away from the first primary first wall indentation by a second inclination,
the second inclination is different from the first inclination, and
the second inclination defines an inclination angle of less than 85 degrees.
2. The tire of claim 1, wherein:
a minimum distance between the first primary first wall indentation and the first primary first wall protrusion is at most 4 mm; and/or
the first primary first wall protrusion and the first primary first wall indentation define a wall projection line, which is a projection of a line that remains in between a centre of the first primary first wall protrusion and a centre of the first primary first wall indentation, the projection being a normal projection to the first primary first wall surface; and the wall projection line forms a minimum angle of at most 30 degrees with the tread, or the wall projection line is parallel to the tread.

3. The tire of the claim 1, wherein a first form that is symmetric with the first primary first wall protrusion about a first symmetry plane is symmetric with the first primary first wall indentation about a second symmetry plane, the second symmetry plane being perpendicular to the first symmetry plane.

4. The tire of claim 1, wherein the first primary first wall indentation is asymmetric about all the planes that have a normal that is parallel to a wall projection line, which is a projection of a line that remains in between a centre of the first primary first wall protrusion and a centre of the first primary first wall indentation, the projection being a normal projection to the first primary first wall surface.

5. The tire of claim 1, wherein:

the first primary first wall protrusion is symmetric about a plane, and/or the first primary first wall indentation is symmetric about a plane.

6. The tire of claim 1, wherein:

the first primary first wall protrusion and the first primary first wall indentation define a wall projection line, which is a projection of a line that remains in between a centre of the first primary first wall protrusion and a centre of the first primary first wall indentation, the projection being a normal projection to the first primary first wall surface, and a length of the first primary first wall protrusion, as measured in the direction of wall projection line is greater than a width of the first primary first wall protrusion, as measured in a direction that is perpendicular to the direction of wall projection line and perpendicular to a norm of the first primary first wall surface and/or a length of the first primary first wall protrusion, as measured in the direction of wall projection line is from 1.5 mm to 20 mm.

7. The tire of claim 1, wherein:

the first primary first wall indentation and the first primary first wall protrusion form a first locking form, the second primary first wall protrusion and second primary first wall indentation form a second locking form, which is geometrically congruent with the first locking form to enable a shape-locking mechanism of the second locking form to the first locking form, and a shape of a projection of the first locking form to the first primary first wall surface resembles one of the following: an infinity sign, a bowtie, a dog bone, a double ended arrow, a rectangle, and a rounded rectangle.

8. The tire of claim 1, wherein:

the first primary first wall is provided with a secondary first primary first wall indentation and secondary first primary first wall protrusion, and the first primary first wall defines a secondary first primary first wall surface having a planar surface or a curved surface, from which the secondary first primary first wall protrusion protrudes and into which the secondary first primary first wall indentation descends.

9. The tire of claim 1, wherein the primary first sipe is producible in a moulding process by using a lamella plate comprising:

a first surface; and a second surface opposite to the first surface wherein the first surface is provided with a first primary plate indentation and a first primary plate protrusion; and the second surface is provided with a second primary plate protrusion that is opposite to the first primary plate indentation and a second primary plate indentation that is opposite to the first primary plate protrusion such that the first surface defines a first primary lamella plate surface having a planar surface or a curved surface, from which the first primary plate protrusion protrudes and into which the first primary plate indentation descends, and the second surface defines a second primary lamella plate surface having a planar surface or a curved surface, from which the second primary plate protrusion protrudes and into which the second primary plate indentation descends;

the first primary plate protrusion and the first primary plate indentation define a projection line that is a projection of a line that remains in between a centre of the first primary plate protrusion and a centre of the first primary plate indentation, the projection being a normal projection to the first primary lamella plate surface, and the first primary plate indentation is asymmetric about all planes that have a normal that is parallel to the projection line.

10. The tire of claim 1, wherein the second inclination is steeper than the first inclination.

11. The tire of claim 1, wherein:

a minimum distance between the first primary first wall indentation and the first primary first wall protrusion is less than or equal to 4 mm, a width of the first wall protrusion decreases towards the first primary first wall indentation, and a width of the first wall indentation decreases towards the first primary first wall protrusion.

* * * * *